(12) United States Patent
Nakano et al.

(10) Patent No.: US 9,172,278 B2
(45) Date of Patent: Oct. 27, 2015

(54) PERMANENT MAGNET TYPE ROTARY ELECTRIC MACHINE AND ELECTRIC POWER STEERING APPARATUS USING THE SAME

(75) Inventors: Masatsugu Nakano, Chiyoda-ku (JP);
Toshihiro Matsunaga, Chiyoda-ku (JP);
Yusuke Morita, Chiyoda-ku (JP); Misa Nakayama, Chiyoda-ku (JP); Kazuhisa Takashima, Chiyoda-ku (JP); Satoru Akutsu, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 183 days.

(21) Appl. No.: 13/697,064

(22) PCT Filed: Sep. 6, 2010

(86) PCT No.: PCT/JP2010/065228
§ 371 (c)(1),
(2), (4) Date: Nov. 9, 2012

(87) PCT Pub. No.: WO2012/032591
PCT Pub. Date: Mar. 15, 2012

(65) Prior Publication Data
US 2013/0154436 A1 Jun. 20, 2013

(51) Int. Cl.
*H02K 1/16* (2006.01)
*H02K 1/27* (2006.01)
(Continued)

(52) U.S. Cl.
CPC .................. *H02K 1/16* (2013.01); *H02K 1/148* (2013.01); *H02K 1/276* (2013.01); *H02K 1/278* (2013.01); *H02K 21/16* (2013.01); *H02K 29/03* (2013.01); *H02K 2213/03* (2013.01)

(58) Field of Classification Search
CPC ........... H02K 1/27; H02K 1/278; H02K 1/28; H02K 1/14; H02K 1/16

USPC ......... 310/216.091–216.094, 156.12–156.21, 310/156.53, 156.56
See application file for complete search history.

(56) References Cited

U.S. PATENT DOCUMENTS 5,086,245 A * 2/1992 Sieja et al. ............. 310/216.094
6,104,117 A * 8/2000 Nakamura et al. ...... 310/216.074
(Continued)

FOREIGN PATENT DOCUMENTS

JP  50-32502 U  4/1975
JP  2001-025182 A  1/2001
(Continued)

OTHER PUBLICATIONS

J.R. Hendershot Jr., Design of Brushless Permanent-Magnet Motors, Magna Physics Publishing and Clarendon Press Oxford 1994, pp. 10, 12 and 13.*

(Continued)

*Primary Examiner* — Thomas Truong
(74) *Attorney, Agent, or Firm* — Sughrue Mion, PLLC; Richard C. Turner

(57) ABSTRACT

Not less than two regions different in magnetic circuit design are provided in a rotational axis direction of the rotor (30), the regions being different by changing a cross-sectional shape in the rotational axis direction in a cross-section perpendicular to a rotational shaft (10) of the rotor (30) having the permanent magnets (1) and the rotor core (2); the supplemental grooves (5) are provided in axial partial regions of each of the teeth (7) of the stator core (3); and the region in which the supplemental groove (5) is provided is each partial region for each region facing a region same in magnetic circuit design of the rotor (30). This enables to reduce cogging torque generated by variations on the rotor side.

13 Claims, 25 Drawing Sheets

(51) Int. Cl.
  *H02K 1/14* (2006.01)
  *H02K 21/16* (2006.01)
  *H02K 29/03* (2006.01)

(56) References Cited

U.S. PATENT DOCUMENTS

| | | | |
|---|---|---|---|
| 6,577,030 B2 * | 6/2003 | Tominaga et al. | 310/68 B |
| 6,940,199 B2 * | 9/2005 | Imamura et al. | 310/156.48 |
| 2009/0267438 A1 * | 10/2009 | Murakami | 310/156.28 |
| 2010/0277026 A1 * | 11/2010 | Yamaguchi et al. | 310/156.25 |
| 2011/0254474 A1 | 10/2011 | Saito et al. | |

FOREIGN PATENT DOCUMENTS

| | | |
|---|---|---|
| JP | 2001-145319 A | 5/2001 |
| JP | 2004-153913 A | 5/2004 |
| JP | 2005-094901 A | 4/2005 |
| JP | 2006-230116 A | 8/2006 |
| JP | 2009-177957 A | 8/2009 |
| JP | 2009-189163 A | 8/2009 |
| JP | 2010-11637 A | 1/2010 |
| JP | 2010-098830 A | 4/2010 |
| WO | 2008/050637 A1 | 5/2008 |
| WO | 2009/084151 A1 | 7/2009 |
| WO | WO 2009084151 A1 * | 7/2009 |
| WO | 2010/044426 A1 | 4/2010 |

OTHER PUBLICATIONS

Japanese Office Action (Decision of Refusal), dated Jun. 17, 2014, Patent Application No. 2012-532746.
International Search Report of PCT/JP2010/065228 dated Nov. 2, 2010.
Japanese Office Action (Notice of Reason for Refusal), dated Dec. 3, 2013, Patent Application No. 2012-532746.
Chinese Office Action, issue d Aug. 26, 2014, Patent Application No. 2010-80068416.7.
Communication dated May 12, 2015 from the Japanese Patent Office in counterpart application No. 2014-141034.

* cited by examiner

A1—A2 cross-section

B1—B2 cross-section

C1—C2 cross-section

D1—D2 cross-section

PERMANENT MAGNET TYPE ROTARY ELECTRIC MACHINE AND ELECTRIC POWER STEERING APPARATUS USING THE SAME

CROSS REFERENCE TO RELATED APPLICATIONS

This application is a National Stage of International Application No. PCT/JP2010/065228 filed Sep. 6, 2010, the contents of all of which are incorporated herein by reference in their entirety.

TECHNICAL FIELD

The present invention relates to a permanent magnet type rotary electric machine which uses permanent magnets for field system and an electric power steering apparatus using the same.

BACKGROUND ART

In recent years, a motor with small cogging torque has been required for various applications such as industrial servo motors and hoists for elevators. In focusing attention on such applications for vehicles, an electric power steering apparatus has become widespread for achieving an improvement in fuel consumption and an improvement in steering performance. Cogging torque of a motor for use in the electric power steering apparatus is transmitted to a driver via gears; and therefore, reduction in cogging torque of the motor is strongly desired in order to obtain a smooth steering feeling. In response, one possible method to reduce the cogging torque is to provide supplemental grooves in a core of a stator. Such a method is disclosed in Patent Document 1, Patent Document 2, and Patent Document 3.

RELATED ART DOCUMENT

Patent Document

Patent Document 1: Japanese Unexamined Patent Publication No. 2001-25182
Patent Document 2: Japanese Unexamined Patent Publication No. 2006-230116
Patent Document 3: Pamphlet of International Patent Unexamined Publication No. WO2009/084151

DISCLOSURE OF THE INVENTION

Problems to be Solved by the Invention

The supplemental grooves are provided over the whole in a rotational axis direction of the motor in a permanent magnet type rotary electric machine of Patent Document 1; and therefore, a problem exists in that the equivalent length of air gap becomes longer and accordingly torque is reduced. Furthermore, Patent Document 1, Patent Document 2, and Patent Document 3 exert an effect to reduce cogging torque of the number of pulsations and an integral multiple thereof of the least common multiple of the number of poles and the number of slots; however, a problem exists in that it is not possible to sufficiently suppress a cogging torque component (a component which pulsates the number of times corresponding to the number of slots by one rotation of a rotor), the cogging torque component being generated by variations on the rotor side, for example, an attachment position error, a shape error, and/or variations in magnetic characteristics of permanent magnets.

This invention has been made to solve the problem as described above, and an object of the present invention is to provide a permanent magnet type rotary electric machine which reduces cogging torque and an electric power steering apparatus using the same.

Means for Solving the Problems

According to the present invention, there is provided a permanent magnet type rotary electric machine including: a rotor having a plurality of magnetic poles composed of permanent magnets and a rotor core; and a stator including armature windings and a stator core which is provided with slots for incorporating the armature windings and has a plurality of teeth facing the rotor. Each of the teeth of the stator core is provided with supplemental grooves at portions facing the rotor. In the permanent magnet type rotary electric machine, not less than two regions different in magnetic circuit design are provided in a rotational axis direction of the rotor, the regions being different by changing a cross-sectional shape in the rotational axis direction in a cross-section perpendicular to a rotational shaft of the rotor having the permanent magnets and the rotor core; the supplemental grooves are provided in axial partial regions of the tooth of the stator core; and the region in which the supplemental groove is provided is each partial region for each region facing a region same in magnetic circuit design of the rotor.

Advantageous Effect of the Invention

The permanent magnet type rotary electric machine according to the present invention can reduce cogging torque (component in which the number of pulsations per one rotation of a rotor corresponds to the number of slots), the cogging torque being generated by variations on the rotor side, for example, an attachment position error, a shape error, and/or variations in magnetic characteristics of the permanent magnets.

Objects, features, aspects, and advantageous effects other than the foregoing of the present invention will become more apparent from the following detailed description of the present invention for referring to the accompanying drawings.

MODE FOR CARRYING OUT THE INVENTION

Embodiment 1

Figure 1:
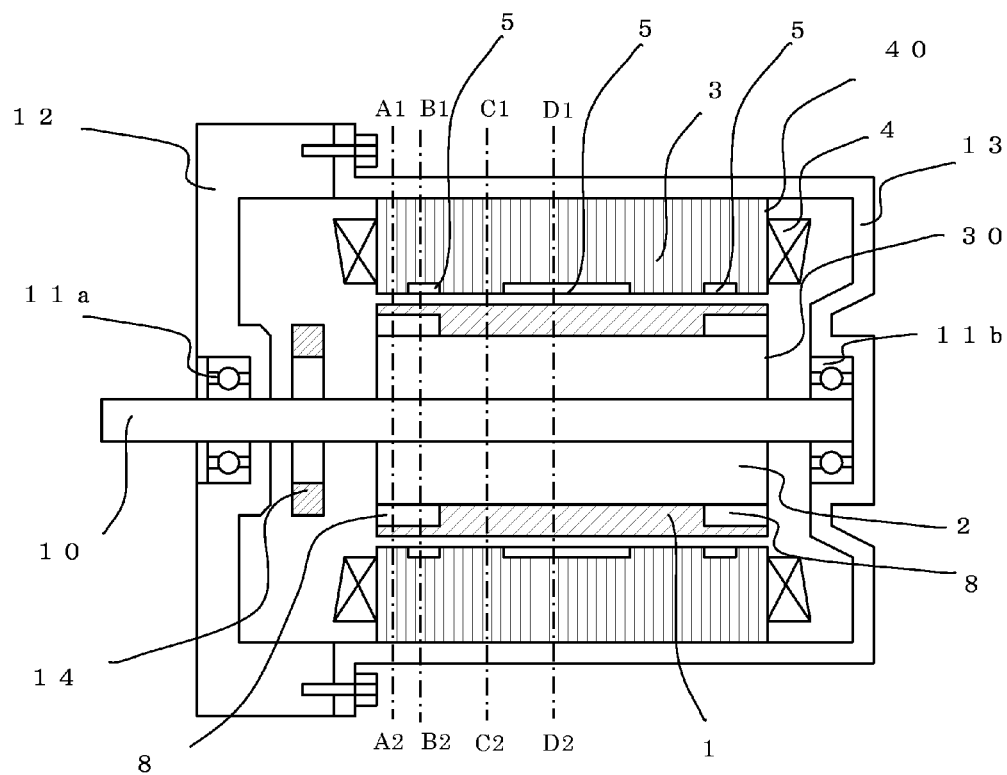
FIG. 1 is a cross-sectional view exemplarily showing a permanent magnet type rotary electric machine according to Embodiment 1 of the present invention.

FIG. 1 shows a typical cross-sectional view in a plane parallel to a rotational shaft and passing through the rotational shaft on a permanent magnet type rotary electric machine of Embodiment 1 of the present invention. Permanent magnets 1 are mounted on the surface of a rotor core 2. Protrusion portions 8 are provided near circumferential end portions of the permanent magnet 1 and the protrusion portions 8 are arranged so as to sandwich the permanent magnets 1. In the case where each of the protrusion portions 8 is arranged between the adjacent permanent magnets 1, the protrusion portions 8 and the permanent magnets 1 are not simultaneously illustrated in a cross-sectional view in a plane parallel to a rotational shaft 10 and passing through the rotational shaft 10; however, the protrusion portions 8 and the permanent magnets 1 are simultaneously illustrated in FIG. 1 for ease of understanding.

The rotational shaft 10 is press-fitted to the rotor core 2 and a rotor 30 is configured to be rotatable by bearings 11a, 11b. A rotational angle sensor 14 that detects a rotational angle is provided on the rotor 30. The rotational angle sensor 14 is formed of, for example, a resolver or a Hall sensor and a magnet or an encoder. A stator core 3 is provided so as to face the permanent magnets 1; and, for example, the stator core 3 can be formed by laminating magnetic steel sheets or formed of a dust core. Armature windings 4 are wound around the stator core 3. A stator 40 is fixed to a frame 13 by press-fitting, shrink-fitting, or the like and the frame 13 is fixed to a housing 12.

Supplemental grooves 5 are provided at portions facing the permanent magnets 1 of the stator core 3. Further, the supplemental grooves 5 are provided at portions in a rotational axis direction. FIG. 1 exemplifies the supplemental grooves 5 arranged at three positions in the axis direction. Although description will be made in detail later, axial positional relationship in which the supplemental grooves 5 are provided is set according to the protrusion portions 8.

Cross-sectional views in a plane perpendicular to the rotational shaft 10 of FIG. 1 are shown in FIGS. 2, 3, 4, and 5. FIGS. 2, 3, 4, and 5 are cross-sections taken along the lines A1-A2, B1-B2, C1-C2, and D1-D2 shown in FIG. 1, respectively. In these cross-sectional views, the permanent magnets 1 are attached on the surface of the rotor core 2; and in these examples, the number of poles (the number of magnetic poles) is 10. Further, the permanent magnet 1 is semicylindrical in cross-sectional shape and reduces harmonic components of magnetic flux to form induced voltage into a sine wave shape; and accordingly, torque pulsations are reduced. The rotor core 2 is provided with the protrusion portions 8, each being formed by a part of the rotor core 2 and made of the same material. The protrusion portions 8 serve to fix and retain the permanent magnets 1 so as not to slip in a circumferential direction.

Figure 2:
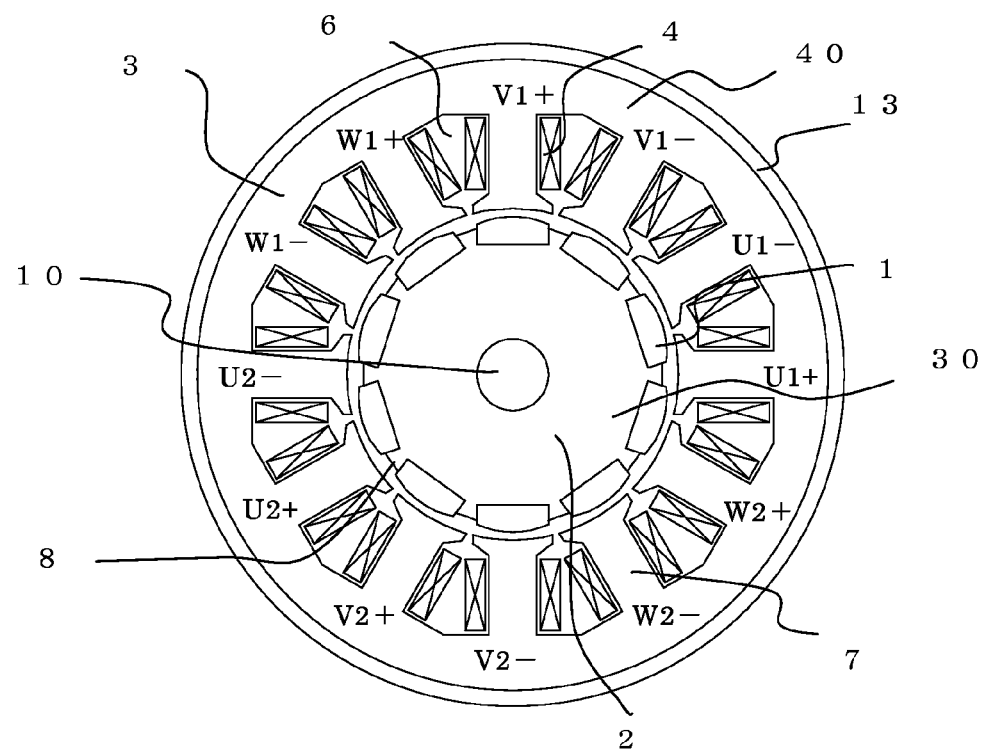
FIG. 2 is a cross-sectional view taken along the line A1-A2 shown in FIG. 1.

Meanwhile, the stator core 3 of the stator 40 is provided with slots 6, each for winding the armature winding 4. In an example of FIG. 2, each of the armature windings 4 is intensively wound around a tooth 7 extending in the radial direction of the stator core 3; and the number of the slots is 12. The armature winding is wound around all of the 12 teeth. Further, the number of phases of the permanent magnet type rotary electric machine is 3; and if they are expressed by U phase, V phase, and W phase, the windings are arranged in the arrangement of U1+, U1−, V1−, V1+, W1+, W1−, U2−, U2+, V2+, V2−, W2−, and W2+ as shown in FIG. 2. In this case, signs + and − denote winding directions; and the winding directions of + and − are opposite to each other. Further, U1+ and U1− are connected in series and U2− and U2+ are also connected in series. These two series circuits can be connected in parallel or connected in series. The same applies to V phase and W phase. Moreover, three phases can be connected in star connection or in delta connection.

Figure 3:
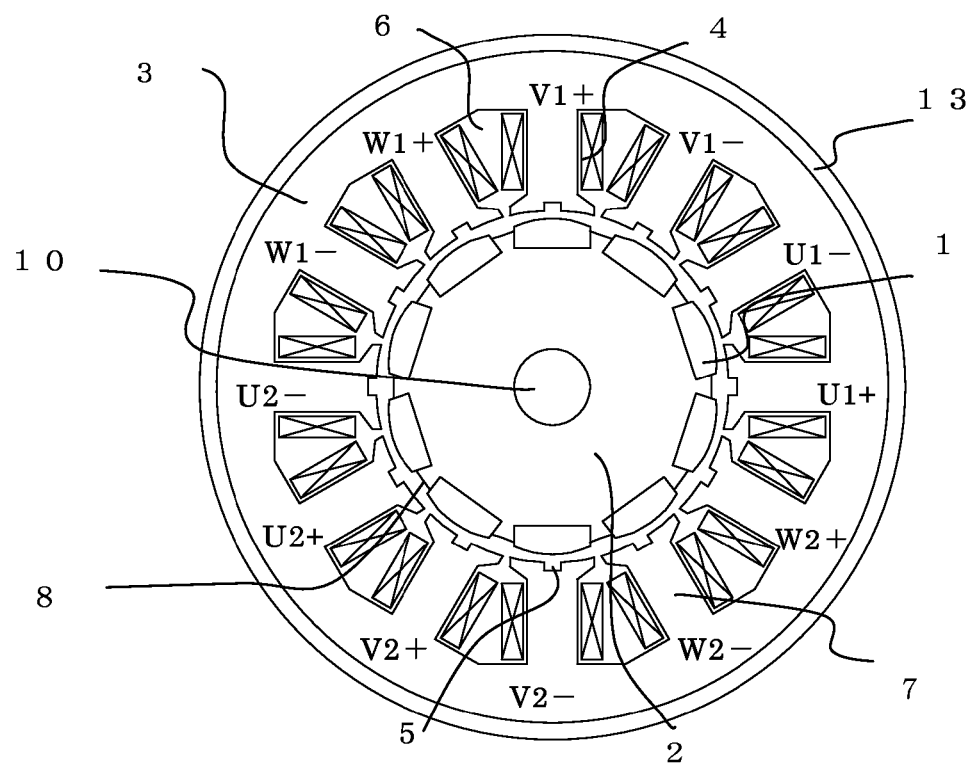
FIG. 3 is a cross-sectional view taken along the line B1-B2 shown in FIG. 1.
Figure 4:
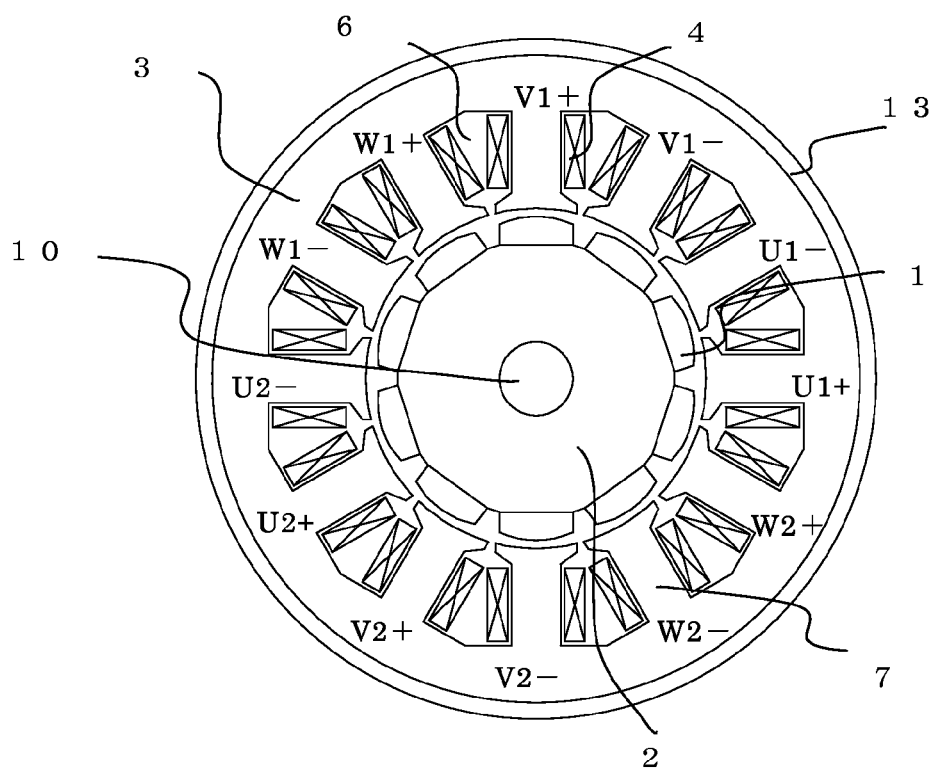
FIG. 4 is a cross-sectional view taken along the line C1-C2 shown in FIG. 1.
Figure 5:
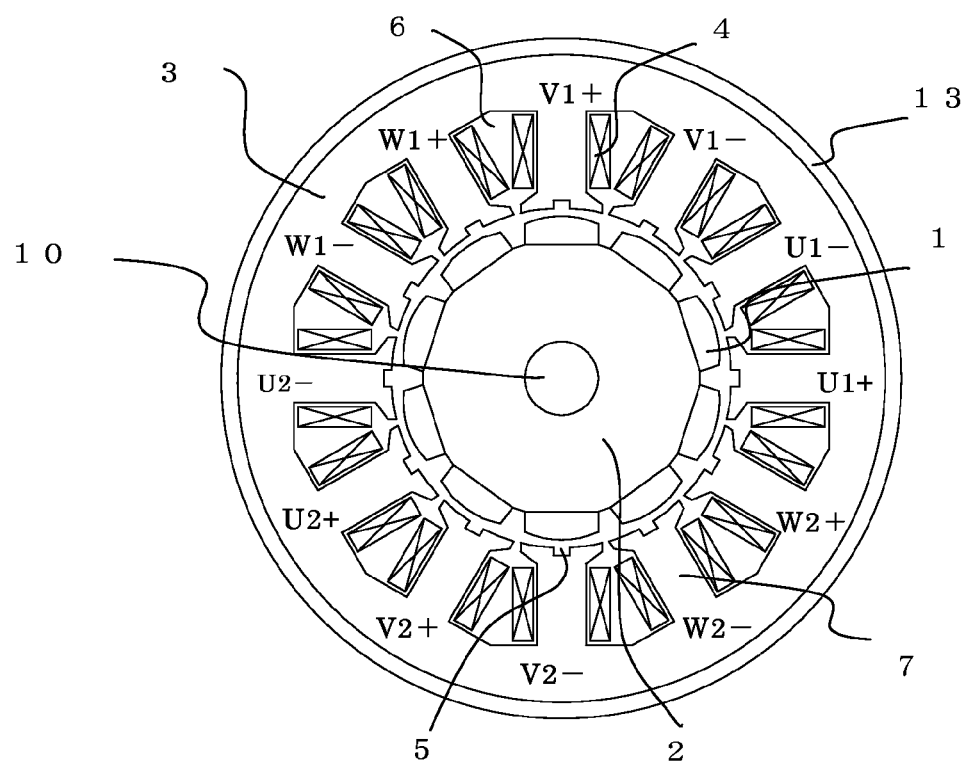
FIG. 5 is a cross-sectional view taken along the line D1-D2 shown in FIG. 1.

FIG. 2 is the cross-section taken along the line A1-A2 shown in FIG. 1; and in the cross-section thereof, the supplemental groove is not provided in the stator core 3 but the protrusion portion 8 is provided in the rotor core 2. FIG. 3 is the cross-section taken along the line B1-B2 shown in FIG. 1; and in the cross-section thereof, the supplemental groove 5 is provided in the stator core 3 and the protrusion portion 8 is provided in the rotor core 2. FIG. 4 is the cross-section taken along the line C1-C2 shown in FIG. 1; and in the cross-section thereof, the supplemental groove 5 is not provided in the stator core 3 and the protrusion portion 8 is not provided in the rotor core 2. FIG. 5 is the cross-section taken along the line D1-D2 shown in FIG. 1; and in the cross-section thereof, the supplemental groove 5 is provided in the stator core 3 but the protrusion portion 8 is not provided in the rotor core 2.

Figure 6:
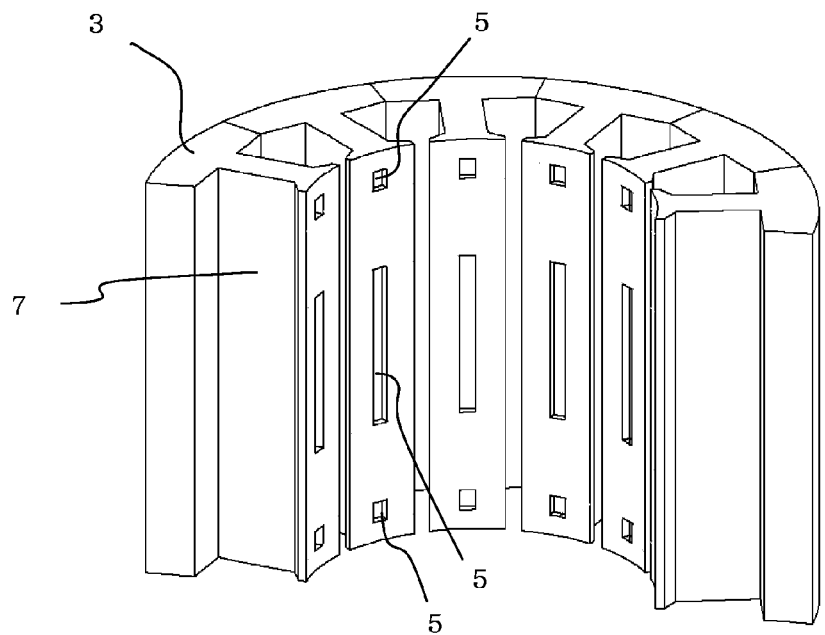
FIG. 6 is a partial perspective view showing a stator core according to Embodiment 1.

FIG. 6 is a partial perspective view showing the stator core of the permanent magnet type rotary electric machine of FIG. 1. FIG. 6 shows only one half, that is, six teeth out of the 12 teeth for ease of understanding the present invention. The stator core 3 is provided with the teeth 7 radially extending and facing the permanent magnets; and the supplemental grooves 5 are provided on the surface of the end of each tooth 7, the surface being faced to the rotor. The supplemental grooves 5 are arranged at three positions in the axis direction and the supplemental groove 5 near the axial center is longer in axial length than other two supplemental grooves 5.

Figure 7:
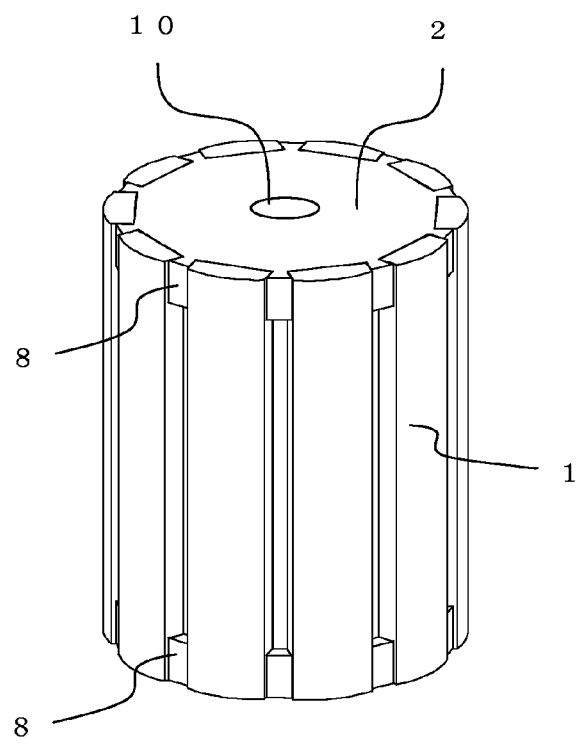
FIG. 7 is a perspective view showing a rotor according to Embodiment 1.

FIG. 7 is a perspective view showing the rotor of the permanent magnet type rotary electric machine of FIG. 1. Portions in which the rotational shaft 10 is protruded from the end faces of the rotor core 2 are omitted for simplicity. Furthermore, a protective cover of the permanent magnet 1 is omitted. The permanent magnets 1 are provided on the surface of the rotor core 2 and each of the protrusion portions 8 is provided between the adjacent permanent magnets 1. Further, the protrusion portions 8 are provided on both axial end portions. In the case where the protrusion portion 8 is formed of a magnetic material, the configuration of magnetic circuit in a cross-section of a plane perpendicular to the rotational shaft 10 is different between a cross-section of a portion in which the protrusion portion 8 is present and a cross-section of a portion in which the protrusion portion 8 is not present.

If the protrusion portions 8 are present, effects exist in that the protrusion portions 8 prevent the permanent magnets 1 from being out of position in the circumferential direction and make the permanent magnets 1 position easily; however, in the case where the presence or absence of the protrusion portions 8 changes in the axis direction or the size of the protrusion portion 8 changes in the axis direction, a problem exists in that cogging torque increases because the magnetic circuit is not uniform in the axis direction. More particularly, cogging torque caused by variations in attachment position, shape, and/or characteristics of the permanent magnet 1 may increase. The present invention has an object to provide the arrangement of the supplemental groove 5 capable of effectively reducing the cogging torque in the permanent magnet type rotary electric machine including the rotor 30 that has the configuration of at least two types of magnetic circuits.

Figure 10:
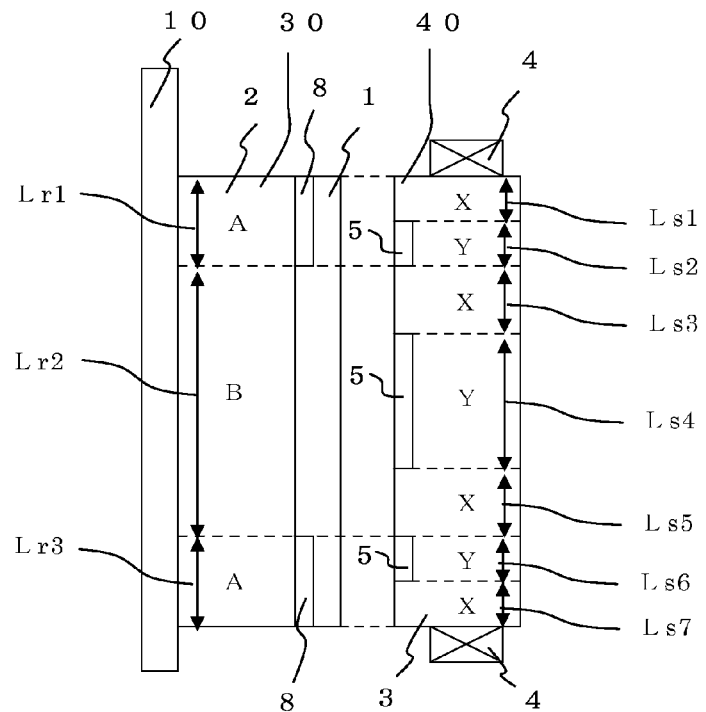
FIG. 10 is a partial cross-sectional view exemplarily showing a permanent magnet type rotary electric machine including the stator core of FIG. 6 and the rotor of FIG. 7.

Hereinafter, the arrangement of the supplemental groove 5 intended for reduction in cogging torque will be described in detail. FIG. 10 is a cross-sectional view of the permanent magnet type rotary electric machine of FIG. 1, that is, the permanent magnet type rotary electric machine including the stator core of FIG. 6 and the rotor of the FIG. 7 and exemplarily shows the cross-sectional view in a plane passing through the rotational shaft. In FIG. 10, symbols A and B are used to discriminate the configuration of the magnetic circuit on the rotor 30 side. A region in which the protrusion portion 8 is present is expressed by A; and a region in which the protrusion portion is not present is expressed by B. In this example, the protrusion portions 8 are provided on both axial end portions; and therefore, arrangement is made in the order of the region A, the region B, and the region A from above toward the page space in FIG. 10. Further, the axial length of these regions is illustrated by symbols Lr1, Lr2, and Lr3, respectively. Meanwhile, in the stator 40 side, a region in which the supplemental groove 5 is absent is expressed by X; and a region in which the supplemental groove 5 is present is expressed by Y. Arrangement is made in the order of X, Y, X, Y, X, Y, and X from above toward the page space in FIG. 10. Further, the axial length of these regions is illustrated by symbols Ls1, Ls2, Ls3, Ls4, Ls5, Ls6, and Ls7, respectively.

A dashed line in FIG. 10 is a line showing a plane perpendicular to the shaft. The same applies to FIG. 11, FIG. 12, and FIG. 13. The dashed line in FIG. 10 shows that the position of an axial end face of the protrusion portion 8 is the same as that of an axial end face of the supplemental groove 5. For example, the lower end face of the upper protrusion portion 8 toward the page space corresponds to the lower end face of the upper supplemental groove 5 toward the page space. Incidentally, FIG. 10, FIG. 11, FIG. 12, and FIG. 13 show that the axial position on the stator side corresponding to the axial position on the rotor side is the same at the positions of the dashed line. In FIG. 10, a relation equation of Lr1=Ls1+Ls2 is established. Similarly, relation equations of Lr2=Ls3+Ls4+Ls5 and Lr3=Ls6+Ls7 are established.

Next, description will be made on a mechanism in which cogging torque can be considerably reduced if the supplemental grooves 5 are arranged as shown in FIG. 10. Ten permanent magnets 1 in the rotor in FIGS. 2 to 5 and FIG. 7 show examples in which the attachment positions of the permanent magnets are equally spaced and the cross-sectional shapes thereof are also the same. However, in fact, variations in manufacture are possible. For example, even when the permanent magnets 1 are accurately attached, the attachment position of the permanent magnets 1 is not equally spaced and may be out of position by approximately several μm to 100 μm in the circumferential direction. Meanwhile, there may be assumed a case where a cross-sectional shape is not also an ideally bilaterally symmetrical shape, one of the right and left thicknesses increases, and the other thickness decreases. Such an example is shown in FIG. 14.

Figure 14:
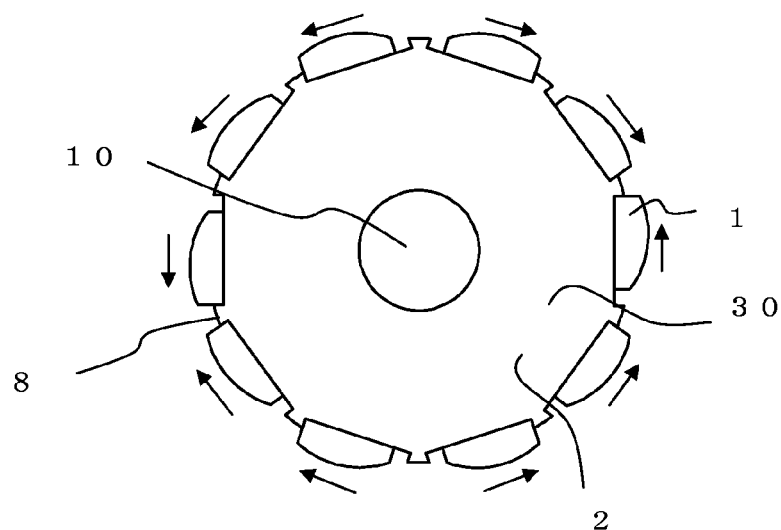
FIG. 14 is a cross-sectional view showing a rotor in the case where an attachment position of a permanent magnet is out of position from an ideally equally-spaced position.

FIG. 14 shows that the attachment position of the permanent magnets is out of position from an ideally equally-spaced position in a direction shown by an arrow. Further, a cross-sectional shape is not also bilaterally symmetrical and a portion of a semicylindrical apex moves in the arrow direction, which shows the cross-sectional shape is not bilaterally symmetrical. As described above, if variations occur in the rotor, cogging torque increases and a component which pulsates the number of times same as the number of slots per one rotation of the rotor appears. In the example of Embodiment 1, the number of slots is 12; and therefore, cogging torque appears 12 times by one rotation of the rotor, that is, cogging torque appears at a period of 30 degrees (360 degrees/12=30 degrees) in mechanical angle.

Figure 15:
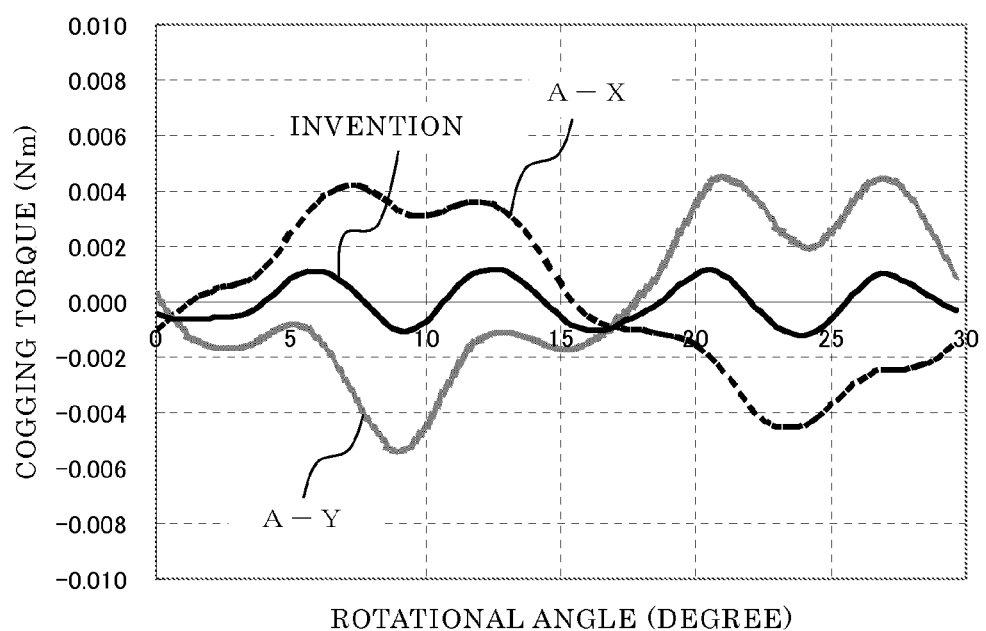
FIG. 15 is an explanation view showing waveforms of a cogging torque for a rotational angle of 30 degrees (mechanical angle)
Figure 16:
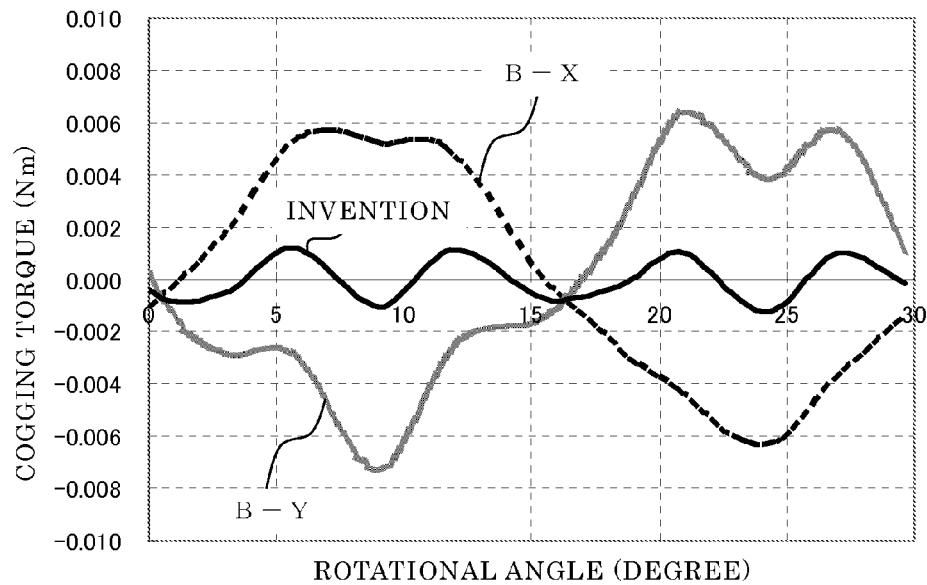
FIG. 16 is an explanation view showing waveforms of a cogging torque for a rotational angle of 30 degrees (mechanical angle).

FIGS. 15, 16 are views showing waveforms of a cogging torque for a rotational angle of 30 degrees (mechanical angle). A waveform shown by the curve A-X in FIG. 15 shows a cogging torque waveform at the time when variations in the permanent magnets 1 are in a state of FIG. 14 in the case where the stator 40 and the rotor 30 of the permanent magnet type rotary electric machine are equally configured in "the presence of the protrusion portion and the absence of the supplemental groove." Meanwhile, a waveform shown by the curve A-Y shows a cogging torque waveform at the time when variations in the permanent magnets 1 are in the state of FIG. 14 in the case where the stator 40 and the rotor 30 are equally configured in "the presence of the protrusion portion and the presence of the supplemental groove." It is observed that these waveforms are large in component with a period of 30 degrees in mechanical angle, which shows that the cogging torque is large.

Further, a waveform shown by an explanatory note "invention" in FIG. 15 is a waveform of cogging torque when variations in the permanent magnets 1 are in the state of FIG. 14 in the case where "the presence of the protrusion portion and the absence of the supplemental groove" and "the presence of the protrusion portion and the presence of the supplemental groove" are simultaneously provided, so that the waveform becomes an average waveform of two waveforms. This waveform is extremely small in component with a period of 30 degrees in mechanical angle and the cogging torque can be considerably reduced. This makes phases of components with a period of 30 degrees in mechanical angle invert by providing the supplemental grooves 5 to cancel out cogging torque at the portion in which the supplemental groove 5 is provided and cogging torque at the portion in which the supplemental groove 5 is absent; and accordingly, the cogging torque is considerably reduced.

Similarly, FIG. 16 shows cogging torque waveforms at the time when variations in the permanent magnets 1 are in the state of FIG. 14 in the case where a waveform shown by the curve B-X is in "the absence of the protrusion portion and the absence of the supplemental groove" and a waveform shown by the curve B-Y is in "the absence of the protrusion portion and the presence of the supplemental groove." Meanwhile, a waveform of the invention is a waveform of cogging torque when variations in the permanent magnets 1 are in the state of FIG. 14 in the case where "the absence of the protrusion portion and the absence of the supplemental groove" and "the absence of the protrusion portion and the presence of the supplemental groove" are simultaneously provided, so that the waveform becomes an average waveform of two waveforms. This case also shows that the waveform is extremely small in component with a period of 30 degrees in mechanical angle, and therefore, the cogging torque can be considerably reduced.

Further, attention needs to be paid that the A-X waveform of FIG. 15 differs from the B-X waveform of FIG. 16 and the A-Y waveform of FIG. 15 differs from the B-Y waveform of FIG. 16. This shows that cogging torque cannot be sufficiently cancelled out in the A-X waveform and the B-Y waveform and cogging torque cannot also be sufficiently cancelled out in the B-X waveform and the A-Y waveform. Therefore, in order to sufficiently reduce a component with a period of 30 degrees in mechanical angle, the arrangement of the supplemental groove 5 needs to consider the arrangement of the protrusion portions 8, that is, magnetic circuit design on the rotor 30 side needs to be considered. Consequently, if the arrangement of the supplemental grooves is made as shown in FIG. 10, the A-X waveform and the A-Y waveform can be cancelled out in the region of the axial length Lr1 and the region of the axial length Lr3; and the B-X waveform and the B-Y waveform can be cancelled out in the region of the axial length Lr2; and therefore, the cogging torque can be considerably reduced. The axial length of providing the supplemental groove 5 should be approximately ½ (for example, ½±10%) of the axial length of the stator core, and more preferably ½ (for example, ½±5%).

Further, in FIG. 10, if the following is given:

$Ls1=Ls2=Lr1/2,$ $Ls4=Ls3+Ls5=Lr2/2,$ and $Ls6=Ls7=Lr3/2,$ the axial length of the regions of A-X is equal to that of the regions of A-Y, and the axial length of the regions of B-X is equal to that of the regions of B-Y; and therefore, it becomes a configuration in which the effect of reduction in cogging torque can be more exerted.

Figure 17:
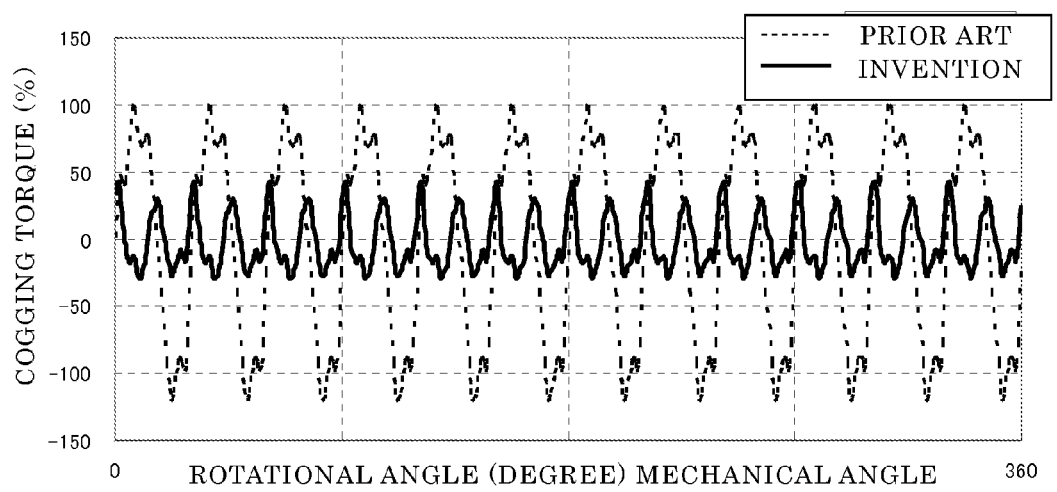
FIG. 17 is an explanation view for comparing waveforms of cogging torque of the present invention with that of a known example (an supplemental groove is absent)
Figure 18:
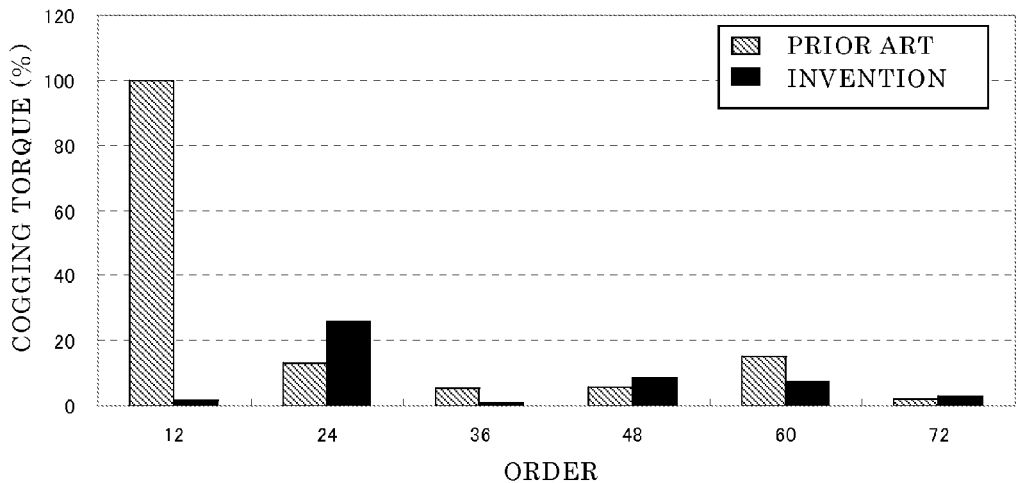
FIG. 18 is an explanation view showing frequency analysis results of the cogging torque waveforms of FIG. 17.

FIG. 17 is a view for comparing waveforms of cogging torque of the configuration of FIG. 10 with cogging torque in the case where the supplemental grooves 5 are not provided as a known example. Standardization is made so that the maximum value of the cogging torque of the known example is 100%. Dashed lines depict the waveform of cogging torque of the known example and components which pulsate 12 times by one rotation of the rotor are noticeably observed. Meanwhile, the invention shown by a solid line is the cogging torque waveform of the configuration of FIG. 10 and confirmation can be made that cogging torque can be considerably reduced. FIG. 18 is frequency analysis results of the cogging torque waveforms of FIG. 17. The invention can considerably reduce a 12th-order component of cogging torque caused by variations on the rotor 30 side as compared to the known example.

Figure 19:
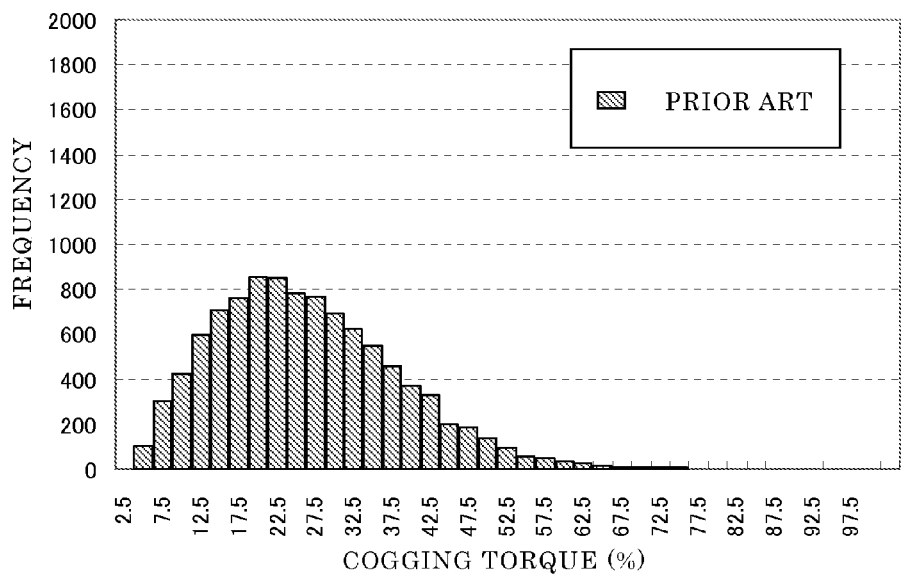
FIG. 19 is an explanation view showing a histogram of cogging torque of the known example.
Figure 20:
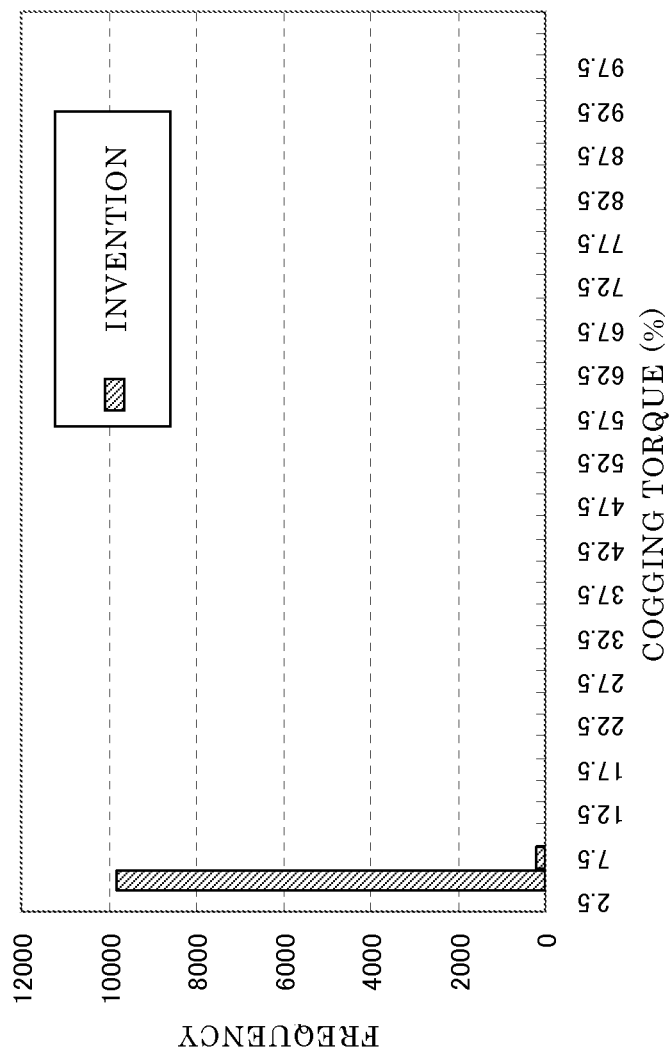
FIG. 20 is an explanation view showing a histogram of cogging torque of the present invention.

The above has described the case where a pattern of variations is as shown in FIG. 14. In order to verify the advantageous effect of the invention, a histogram is created for the 12th-order component of cogging torque (component in which the number of pulsations corresponds to the number of slots) in a total of 10,000 rotary electric machines on the assumption that random variations occur in each of the ten permanent magnets. The results are shown in FIG. 19 and FIG. 20. FIG. 19 is a histogram of the known example and FIG. 20 is a histogram of the configuration of FIG. 10 (the invention). A vertical axis is frequency; and a horizontal axis is the amplitude of cogging torque and is shown in percent value as in a vertical axis of FIG. 17. Comparison is made on the assumption that variation conditions on the rotor 30 side are the same. Cogging torque is widely distributed in FIG. 19 and therefore a problem exists in that the cogging torque becomes large according to the pattern of variations.

However, in the configuration of the invention, it shows that the cogging torque is small regardless of the pattern of variations in the permanent magnets 1 of the rotor 30. That is, the permanent magnet type rotary electric machine with high robustness against variations in manufacture on the rotor 30 side can be obtained. The configuration of the known supplemental grooves is targeted at the effect of reduction in component in which the number of pulsations per one rotation of the rotor corresponds to the least common multiple of the number of poles and the number of slots; and therefore, the effect of reduction cannot be sufficiently obtained for a component (component in which the number of pulsations corresponds to the number of slots) generated by the variations on the rotor 30 side.

Figure 11:
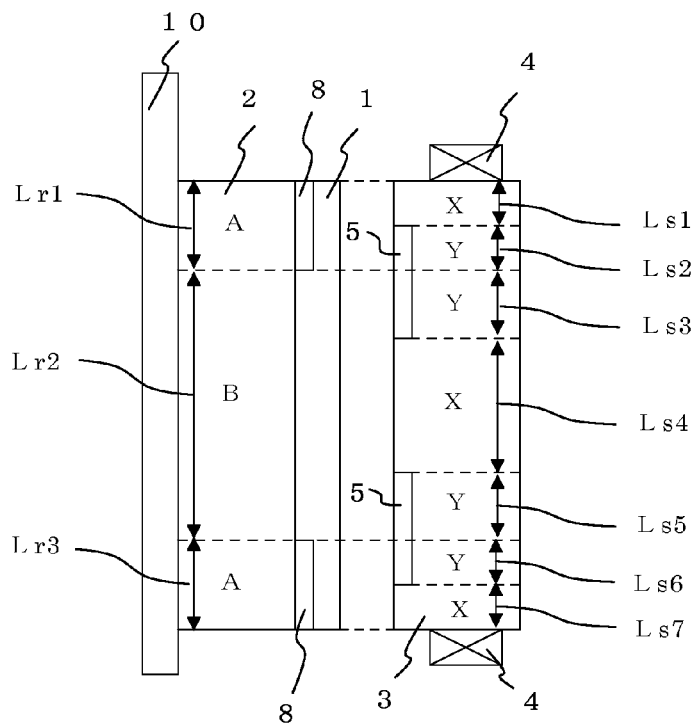
FIG. 11 is a partial cross-sectional view exemplarily showing a permanent magnet type rotary electric machine including a stator core and the rotor of FIG. 7.

The configuration of FIG. 11 can also obtain an effect similar to that of FIG. 10. FIG. 11 is an example in which the arrangement of the protrusion portions 8 of the rotor core 2 is the same as that of FIG. 10, but the arrangement of the supplemental grooves 5 of the stator core 3 is different. The example is such that the supplemental groove 5 provided in the region of Ls4 shown in FIG. 10 is provided in regions of Ls3 and Ls5; and accordingly, the supplemental grooves 5 are arranged at two places in the axis direction. The arrangement of such supplemental grooves 5 can also obtain the effect of reduction in cogging torque by a mechanism described in the example of FIG. 10. Furthermore, as in FIG. 10, the axial length of providing the supplemental groove 5 should be approximately ½ (for example, ½±10%) of the axial length of the stator core, and more preferably ½ (for example, ½±5%).

Further, it goes without saying that, in FIG. 11, if the following is given:

$$Ls1=Ls2=Lr1/2,$$

$$Ls4=Ls3+Ls5=Lr2/2,$$

and $$Ls6=Ls7=Lr3/2,$$

the axial length of the regions of A-X is equal to that of the regions of A-Y, and the axial length of the regions of B-X is equal to that of the regions of B-Y; and therefore, it becomes a configuration in which the effect of reduction in cogging torque can be more exerted.

Figure 8:
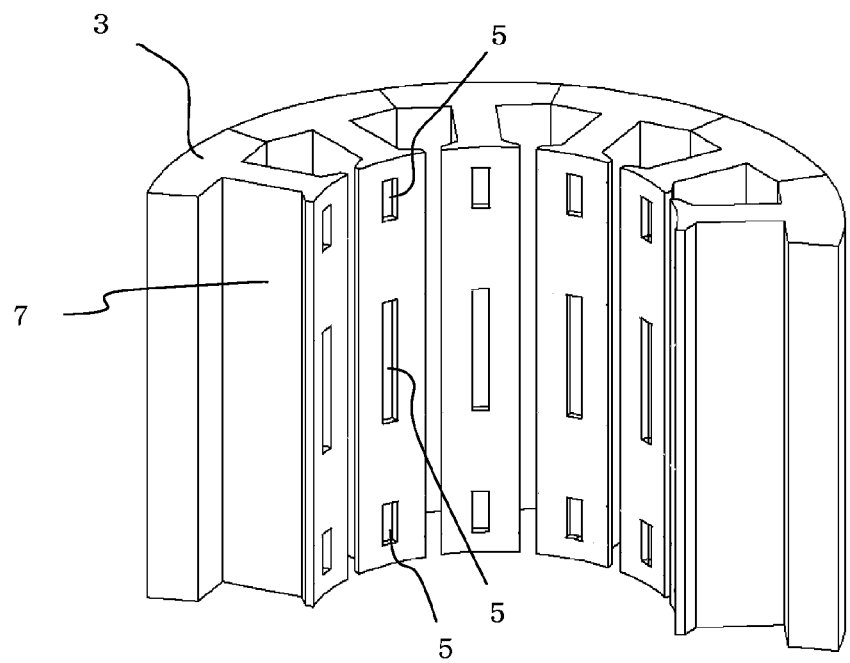
FIG. 8 is a partial perspective view showing a different stator core according to Embodiment 1.
Figure 9:
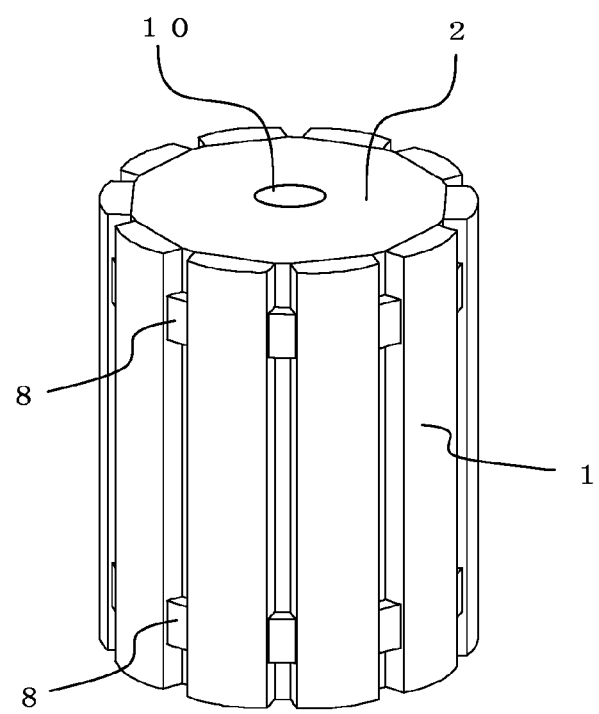
FIG. 9 is a perspective view showing a different rotor according to Embodiment 1.

Although the examples in which the protrusion portions 8 are arranged on both axial end portions are described in FIGS. 6, 7, 10, and 11, an application range of the present invention is not limited to these examples. Other examples are shown in FIGS. 8 and 9. FIG. 8 is a partial perspective view showing a different stator core of a permanent magnet type rotary electric machine according to Embodiment 1. FIG. 8 shows one half, that is, six teeth out of the 12 teeth for ease of understanding. FIG. 9 is a perspective view showing a different rotor of a permanent magnet type rotary electric machine according to Embodiment 1. Portions in which the rotational shaft 10 is protruded from the end faces of the rotor core 2 are omitted for simplicity. Furthermore, a protective cover of the permanent magnet 1 is omitted. The permanent magnets 1 are provided on the surface of the rotor core 2. Protrusion portions 8, each being formed by a part of the rotor core 2 and made of the same material, are provided between the adjacent permanent magnets 1 to fix and retain the permanent magnets 1. Further, the protrusion portions 8 are provided at positions apart from both axial end portions by a predetermined distance.

Figure 12:
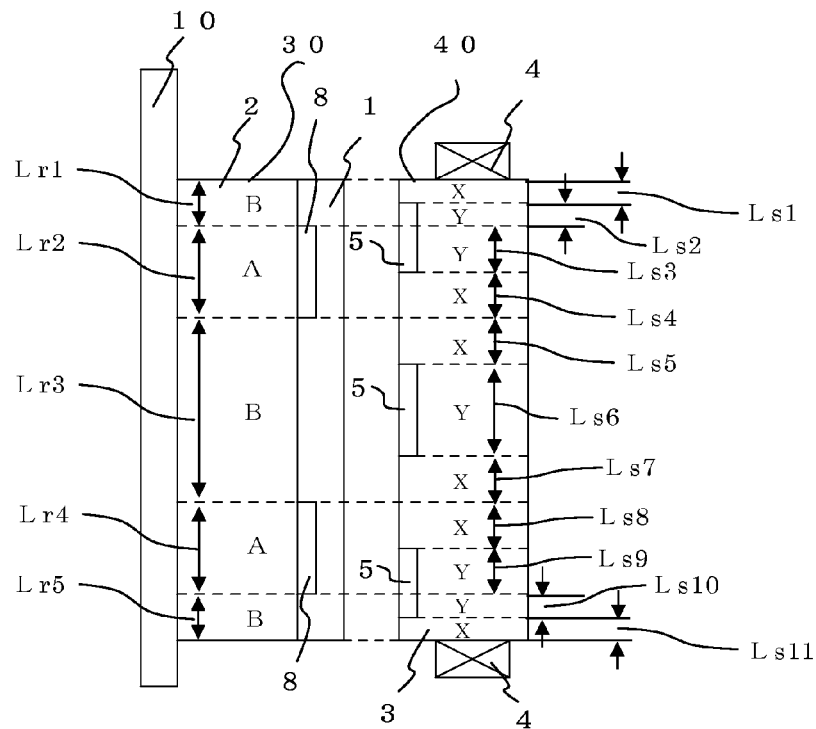
FIG. 12 is a partial cross-sectional view exemplarily showing a permanent magnet type rotary electric machine including the stator core of FIG. 8 and the rotor of FIG. 9.
Figure 13:
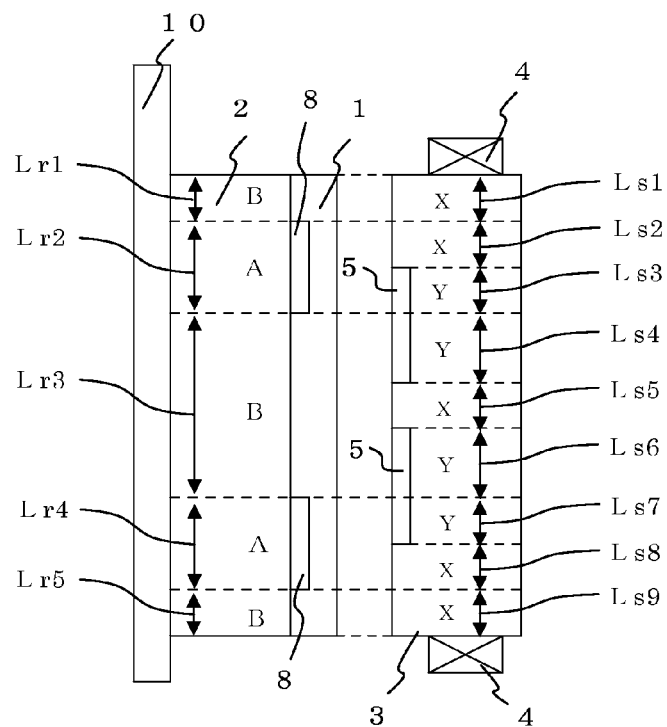
FIG. 13 is a partial cross-sectional view exemplarily showing a permanent magnet type rotary electric machine including a stator core and the rotor of FIG. 9.

Cross-sectional views corresponding to these examples are shown in FIG. 12 and FIG. 13. In FIG. 12 and FIG. 13, the protrusion portions 8 of the rotor core are provided at two places in the axis direction and the axial positions thereof are apart from end portions by Lr1 or Lr5. With respect to the configuration of such a rotor, FIG. 12 shows an example in which three supplemental grooves 5 are arranged in the axis direction of the stator core 3 and FIG. 13 shows an example in which two supplemental grooves 5 are arranged. If the arrangement of the supplemental grooves 5 is made as shown in FIG. 12, the A-X waveform and the A-Y waveform can be cancelled out in a region of an axial length Lr2 and a region of an axial length Lr4; and the B-X waveform and the B-Y waveform can be cancelled out in a region of axial lengths Lr1, Lr3, and Lr5; and therefore, the cogging torque can be considerably reduced. The axial length of providing the supplemental groove 5 should be approximately ½ (for example, ½±10%) of the axial length of the stator core, and more preferably ½ (for example, ½±5%).

Further, in FIG. 12, if the following is given:

$$Ls1=Ls2=Lr1/2,$$

$$Ls3=Ls4=Lr2/2,$$

$$Ls5+Ls7=Ls6=Lr3/2,$$

$$Ls8=Ls9=Lr4/2,$$

and $$Ls10=Ls11=Lr5/2,$$

the axial length of the regions of A-X is equal to that of the regions of A-Y, and the axial length of the regions of B-X is equal to that of the regions of B-Y; and therefore, it becomes a configuration in which the effect of reduction in cogging torque can be more exerted.

Meanwhile, if the arrangement of the supplemental grooves 5 is made as shown in FIG. 13, the A-X waveform and the A-Y waveform can be cancelled out in a region of an axial length Lr2 and a region of an axial length Lr4; and the B-X waveform and the B-Y waveform can be cancelled out in a region of axial lengths Lr1, Lr3, and Lr5; and therefore, the cogging torque can be considerably reduced. The axial length of providing the supplemental groove 5 should be approximately ½ (for example, ½±10%) of the axial length of the stator core, and more preferably ½ (for example, ½±5%).

Further, in FIG. 13, if the following is given:

$$Ls1=Lr1,$$

$$Ls2=Ls3=Lr2/2,$$

$$Ls7=Ls8=Lr4/2,$$

$$Ls4+Ls6=Ls1+Ls5+Ls9=(Lr1+Lr3+Lr5)/2,$$

and $$Ls9=Lr5,$$

the axial length of the regions of A-X is equal to that of the regions of A-Y, and the axial length of the regions of B-X is equal to that of the regions of B-Y; and therefore, it becomes a configuration in which the effect of reduction in cogging torque can be more exerted.

Although the examples shown in this time are those in which the presence or absence of the protrusion portion of the rotor core changes in the axis direction, the application of the present invention is not limited to these examples. In the case where not less than two types of regions different in magnetic circuit design of the rotor are provided in the axis direction, for example, in the case where the protrusion portions are not present but concave portions are present between the adjacent permanent magnets, in the case where the cross-sectional shape of the permanent magnet changes, and the like, the supplemental grooves are provided in a similar manner; and accordingly, cogging torque can be considerably reduced.

As described above, in the rotor, if the configuration is made such that not less than two regions different in magnetic circuit design are provided in the axis direction, the regions being different by changing at least one of a cross-sectional shape in the rotational axis direction in a cross-section perpendicular to the rotational shaft of the rotor core and a cross-sectional shape in a cross-section perpendicular to the rotational shaft of the permanent magnets; the supplemental grooves are provided in the axial partial regions of the stator core; and the region in which the supplemental groove is provided is each partial region for each region facing a region same in magnetic circuit design of the rotor, it becomes possible to considerably reduce cogging torque (component in which the number of pulsations by one rotation of the rotor corresponds to the number of slots), the cogging torque being generated by variations on the rotor side, for example, an attachment position error, a shape error, and/or variations in magnetic characteristics of the permanent magnets. Incidentally, the above mentioned region facing a region same in magnetic circuit design of the rotor represents a stator side region corresponding to a region same in magnetic circuit design of the rotor at the time when the rotor side and the stator side are delimited in a plane perpendicular to the shaft.

Further, if the configuration is made such that the region in which the supplemental groove is provided is a half of each axial length for each region facing a region same in magnetic circuit design of the rotor, an effect is sufficiently exerted in that cogging torque generated at the region in which the supplemental groove is provided and cogging torque generated at the region in which the supplemental groove is not provided are cancelled out. Therefore, it becomes possible to more effectively reduce cogging torque (component in which the number of pulsations by one rotation of the rotor corresponds to the number of slots), the cogging torque being generated by variations on the rotor side, for example, an attachment position error, a shape error, and/or variations in magnetic characteristics of the permanent magnets.

If the configuration is made such that a region provided with the protrusion portion in an axial portion of the rotor core is present, positioning of the permanent magnets can be made because of the presence of the protrusion portion; and therefore, an effect exists in that the accuracy of the attachment position improves. At the same time, the configuration is made such that the supplemental groove is provided; and accordingly, this allows to prevent cogging torque generated by the difference in magnetic circuit design due to the protrusion portion from increasing, and to effectively reduce cogging torque (component in which the number of pulsations by one rotation of the rotor corresponds to the number of slots) generated by variations on the rotor side. Furthermore, the configuration is made such that the supplemental grooves are not provided at axial end portions as shown in FIGS. 6 and 8; and accordingly, a portion having a large gap formed with respect to the rotor at each axial end portion can be reduced as compared to the case where the supplemental grooves are provided at the axial end portions. This increases an effect that prevents foreign particles from entering into the gap portion between the stator and the rotor.

Figure 21:
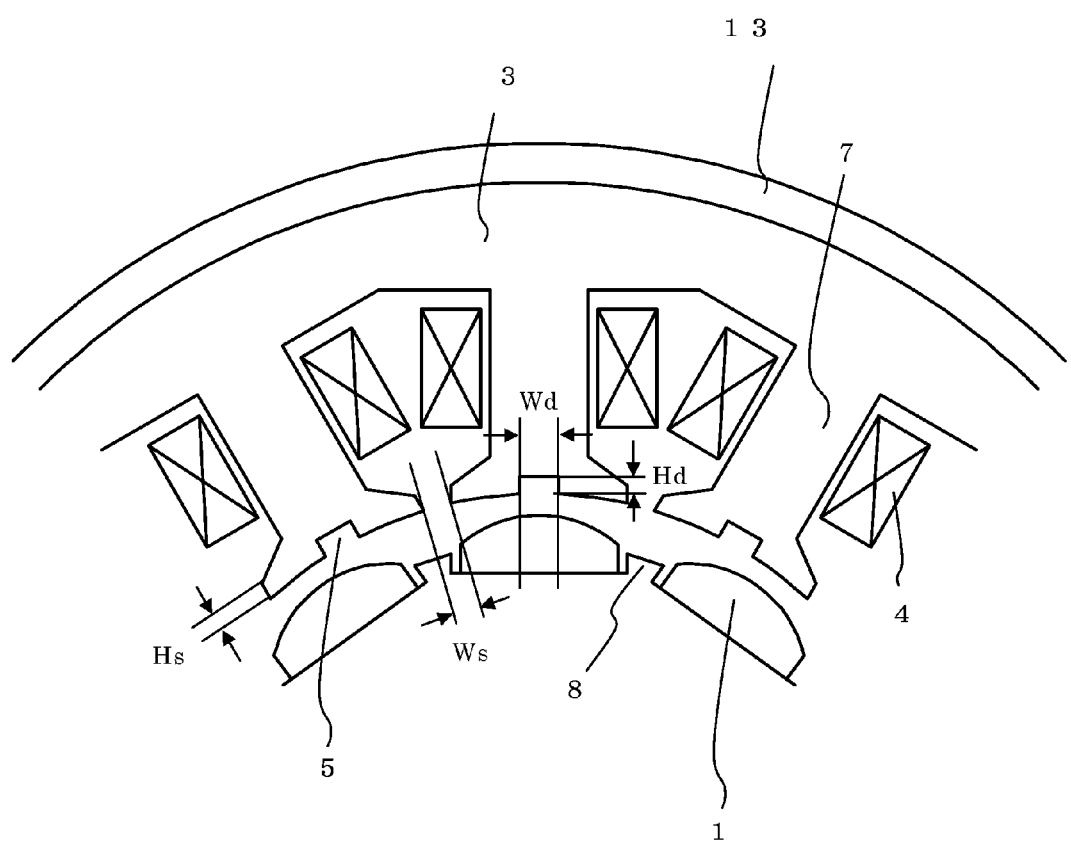
FIG. 21 is an explanation view showing an supplemental groove and a slot opening portion.
Figure 22:
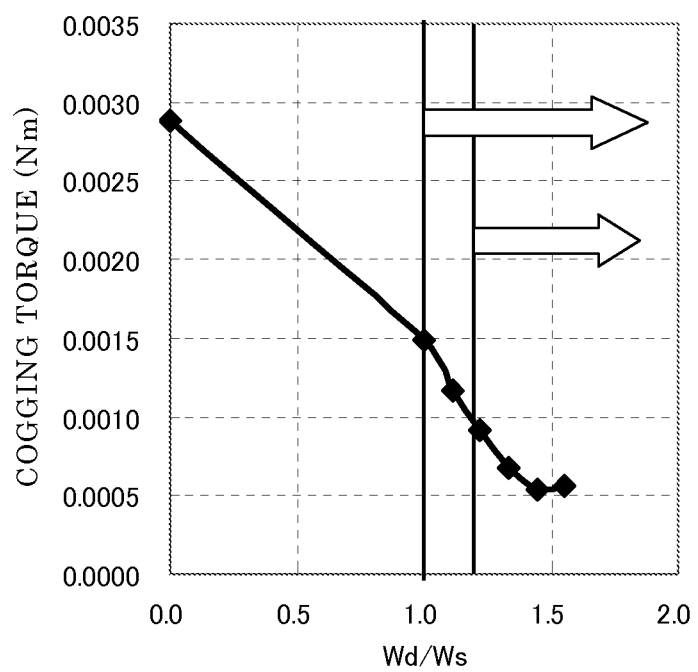
FIG. 22 is an explanation view showing the relationship between the width of an supplemental groove and cogging torque.

Next, the shape of the supplemental groove will be described. FIG. 21 is a view for explaining the width of the supplemental groove Wd, the depth of the supplemental groove Hd, the width of a slot opening Ws, and the thickness of a tooth end portion Hs. In the structure of the present invention, phases of components in which the number of cogging torque pulsations corresponds to the number of slots are inverted at a portion in which the supplemental groove is provided and a portion in which the supplemental groove is not provided to obtain a cancelling out effect; and therefore, the selection of the shape of the supplemental groove has an influence on the size of the effect. FIG. 22 is a graph in which a horizontal axis is the ratio of the width of the supplemental groove Wd to the width of the slot opening Ws and a vertical axis is overall values of the cogging torque at the time when variations occur in the rotor.

As compared to the case where Wd/Ws=0, in other words, the supplemental groove is not provided; if Wd/Ws≥1.0, the cogging torque is not more than ½ of the case where the supplemental groove is not provided. Further, if Wd/Ws≥1.25, the cogging torque is 0.001 Nm that is an extremely small value. If the cogging torque due to variations of the rotor is suppressed to this extent, for example, in the case where a rotary electric machine is incorporated in an electric power steering apparatus (to be described later), an effect is obtained in that a driver can obtain good steering feeling without feeling cogging torque.

If Wd/Ws≥1.0, phases of components in which the number of cogging torque pulsations corresponds to the number of slots can be inverted by changing components of permeance pulsations due to the slots of the stator core; and therefore, cogging torque at the portion in which the supplemental groove 5 is provided and cogging torque at the portion in which the supplemental groove is absent can be cancelled out each other. In the case where one supplemental groove is provided, Wd/Ws≥1.0 can be used; and in the case where not less than two supplemental grooves are provided, Wd/Ws≥1.0 can be used by defining the total of the widths of all the supplemental grooves provided in the tooth as Wd; and accordingly, similar effects can be obtained.

Further, the depth of the supplemental groove Hd is preferably larger than the thickness of the tooth end portion Hs. Also, phases of components in which the number of pulsations corresponds to the number of slots can be inverted by changing the component of permeance pulsations due to the slots of the stator core. It becomes possible to sufficiently exert an effect that cancels out the above mentioned cogging torque at the portion in which the supplemental groove is provided and cogging torque at the portion in which the supplemental groove is absent.

Patent Document 1, Patent Document 2, and Patent Document 3 disclose examples in which two or not less than two supplemental grooves are provided in each tooth in the circumferential direction; however, in Embodiment 1, one supplemental groove is provided at a circumferential center portion in each tooth. A cogging torque Sth-order component (S is the number of slots) generated by variations on the rotor side is largely involved with an Sth-order component of permeance pulsations due to the slots of the stator; however, an effects exists in that it is easy to change an amplitude and a phase of the Sth-order component of the permeance pulsations by providing one supplemental groove. When the number of the supplemental grooves is smaller, the average length of gap becomes shorter. Therefore, one supplemental groove is provided at the circumferential center portion and only at an axial portion; and accordingly, degradation of torque during load application can be minimized.

In Embodiment 1, the supplemental groove has a shape formed by cutting out the core in a rectangular shape, but the supplemental groove is not limited to this shape. For example, it goes without saying that similar effects can be obtained by a shape formed by cutting out the core in an arc-like shape, cutting out in a triangle shape, and the like. Furthermore, the permanent magnet type rotary electric machine with 10 poles and 12 slots shown in Embodiment 1 is larger in the winding factor of a fundamental wave than that with the number of poles:the number of slots=2:3, which has been conventionally and widely used; and therefore, the rotary electric machine in Embodiment 1 is suitable for use in small size and high output machines. In addition, as compared to a rotary electric machine with the same number of slots, the least common multiple of the number of poles and the number of slots is 60 in the case of 10 poles and 12 slots, and 24 in the case of 8 poles and 12 slots; and accordingly, the rotary electric machine with 10 poles and 12 slots is smaller in cogging torque of order of the least common multiple. However, a problem exists in that cogging torque caused by variations on the rotor side of the rotary electric machine with 10 poles and 12 slots is larger than that with 8 poles and 12 slots and robustness against variations in manufacture is low. However, the problem can be solved by Embodiment 1; and therefore, there can be obtained a permanent magnet type rotary electric machine which achieves small size and high output, and reduction in cogging torque caused by variations in manufacture at the same time.

Embodiment 1 shows the example in which the protrusion portions are provided on the rotor core. If the protrusion portions are present, effects exist in that positioning of the permanent magnets can be made and the permanent magnets can be prevented from being out of position in the circumferential direction; whereas, a problem exists in that a cogging torque Sth-order component (S is the number of slots) becomes large due to the difference of magnetic circuit design. However, Embodiment 1 can solve the problem and can achieve the effects of positioning the permanent magnets and preventing the permanent magnets from being out of position in the circumferential direction, and the reduction in the cogging torque Sth-order component at the same time.

Embodiment 2

Embodiment 1 describes the example in which the number of poles (the number of magnetic poles) is 10 and the number of slots is 12; however, the present invention is not limited to this example. In the case of the combination of the following relationship $$0.75 < S/P < 1.5,$$

where, P is the number of poles and S is the number of slots in a permanent magnet type rotary electric machine, there is known a small size and high torque permanent magnet type rotary electric machine in which the winding factor is high and magnetic flux of permanent magnets is efficiently used as compared to the case of S/P=0.75 and S/P=1.5 described in Patent Document 1, Patent Document 2, and Patent Document 3.

Further, the least common multiple of the number of poles and the number of slots are large; and therefore, it is also known that a cogging torque component which pulsates the number of times corresponding to the least common multiple of the number of poles and the number of slots by one rotation of a rotor is small as compared to the case of S/P=0.75 and S/P=1.5. Meanwhile, a problem exists in that a cogging torque Sth-order component (component which pulsates the number of S times by one rotation of the rotor) is large and robustness against variations on the rotor side is low, the cogging torque Sth-order component being generated by variations on the rotor side, for example, an attachment position error, a shape error, and/or variations in magnetic characteristics of the permanent magnets. Therefore, this problem needs to be solved in the permanent magnet type rotary electric machine to be mass-produced as in the case where the rotary electric machine is incorporated in an electric power steering apparatus.

Then, if the present invention is applied to the permanent magnet type rotary electric machine having the combination of the following relationship $$0.75 < S/P < 1.5,$$

this enables to increase robustness against variations on the rotor side and to reduce the cogging torque Sth-order component.

Among the permanent magnet type rotary electric machines satisfying the following relationship $$0.75 < S/P < 1.5,$$

Figure 23:
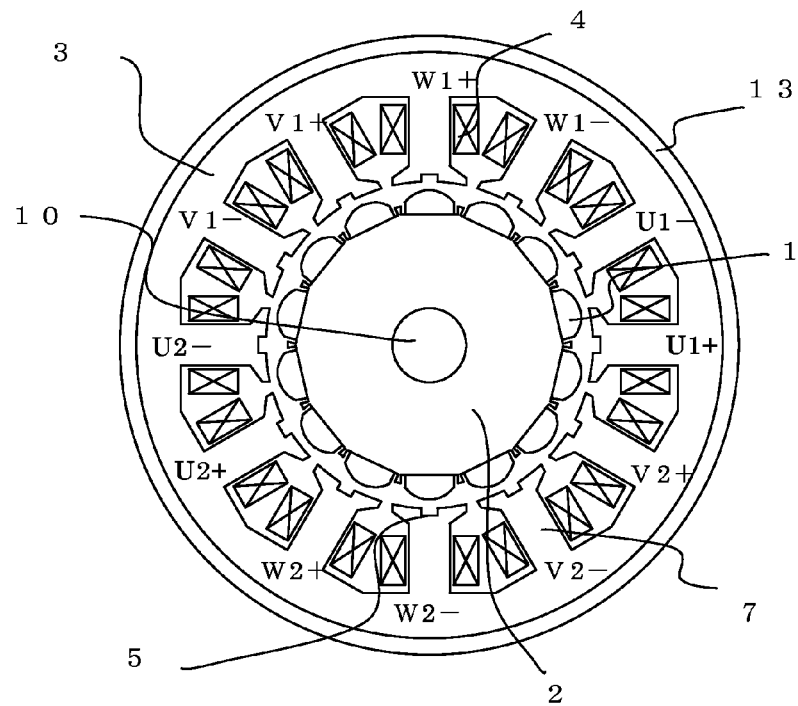
FIG. 23 is a cross-sectional view showing a permanent magnet type rotary electric machine according to Embodiment 2.
Figure 24:
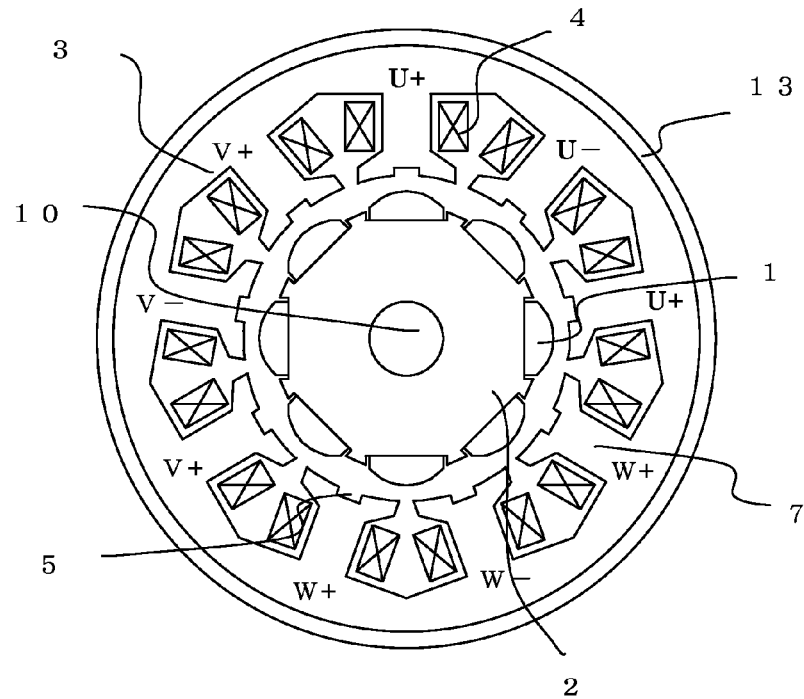
FIG. 24 is a cross-sectional view showing a different example of a permanent magnet type rotary electric machine according to Embodiment 2.
Figure 25:
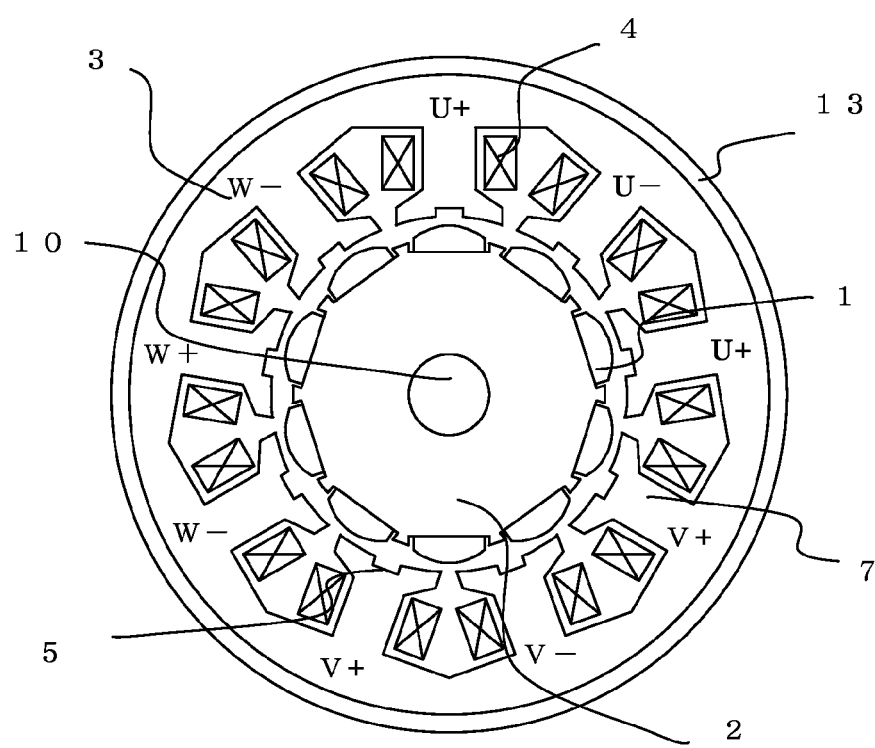
FIG. 25 is a cross-sectional view showing a further different example of a permanent magnet type rotary electric machine according to Embodiment 2.

FIG. 23 shows an example having P=14 and S=12, FIG. 24 shows an example having P=8 and S=9, and FIG. 25 shows an example having P=10 and S=9.

One supplemental groove 5 is provided in each tooth. FIGS. 23, 24, and 25 are cross-sectional views each showing a cross-sectional view of portions in which the supplemental grooves 5 are provided. Although there are portions in which the supplemental grooves 5 are not provided according to an axial position as in Embodiment 1, such a drawing is omitted. If such a configuration is made, the winding factor is high; and therefore, both effects can be achieved at the same time, one effect being a small size and high torque and the other effect being high in robustness against variations on the rotor side.

Furthermore, the same effect can be obtained with the combination of an integral multiple of the number of poles and the number of slots. Therefore, when expressed generally including the number of poles P=10 and the number of slots S=12, the same effects can be obtained if the following is given:

the number of poles P=12n±2n and the number of slots S=12n, and the number of poles P=9n±n and the number of slots S=9n, where n is natural number.

Embodiment 3

Figure 26:
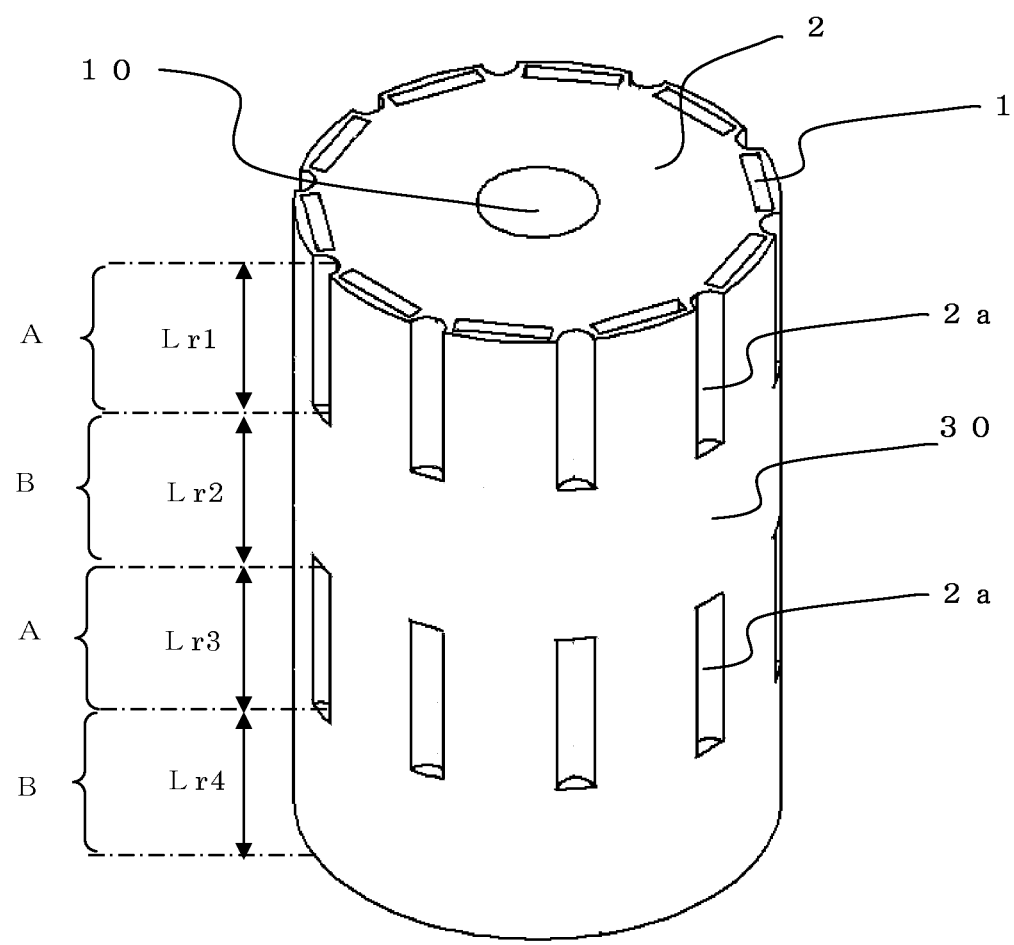
FIG. 26 is a perspective view showing a rotor according to Embodiment 3.
Figure 29:
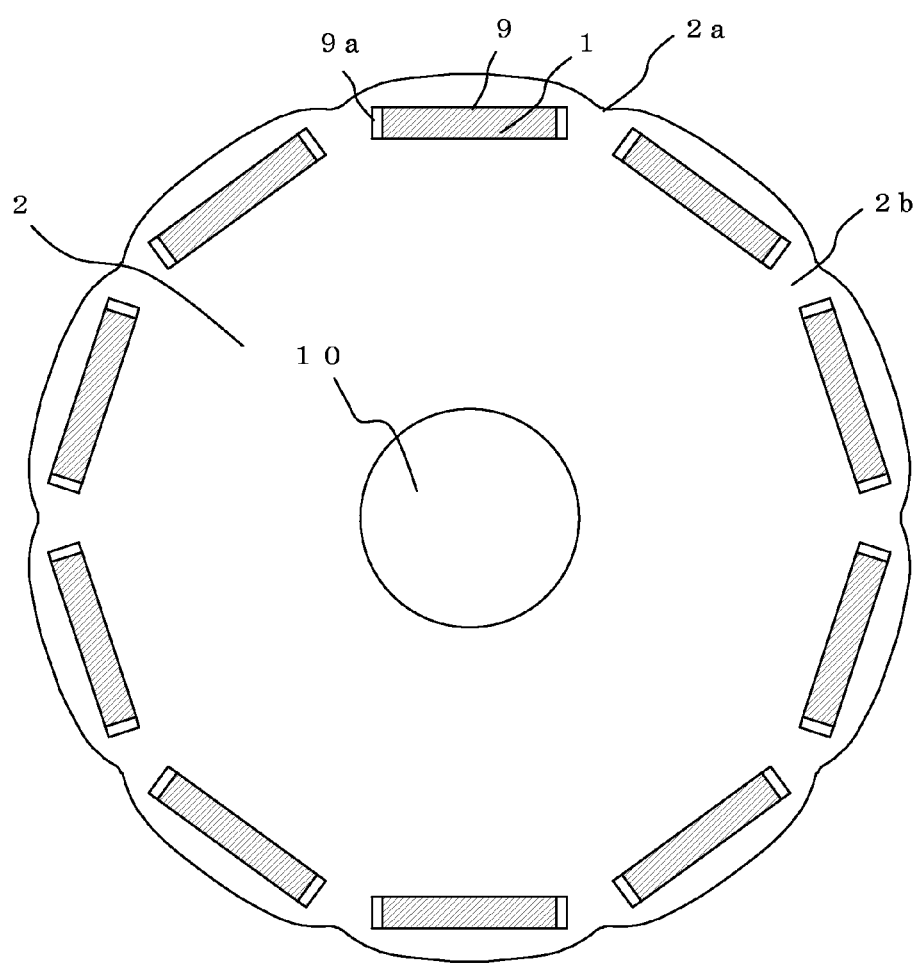
FIG. 29 is a cross-sectional view showing a rotor according to Embodiment 3.

The aforementioned embodiments are the examples of the surface magnet type in which the permanent magnets are attached on the surface of the rotor core; however, the present invention can be applied, but not limited to this example. FIG. 26 is a magnet embedded type structure in which permanent magnets 1 are embedded in a plurality of opening portions 9 (FIG. 29) provided inside a rotor core 2 in a rotational axis direction. A rotational shaft 10 is inserted in the rotor core 2. The permanent magnets 1, each having a flat shape, are embedded in the rotor core 2 to constitute a plurality of magnetic poles. Further, the rotor core 2 includes concave grooves 2a each provided on a surface portion at an axial portion between the adjacent magnetic poles along the magnetic poles. A cross-sectional view having the concave grooves 2a is shown in FIG. 29. The permanent magnet 1 is embedded in the opening portion 9 of the rotor core 2 and non-magnetic air gap portions 9a are provided on the right and the left of the permanent magnet 1. Further, a core portion 2b between the magnetic poles is provided in a magnetic path portion of the rotor core 2 provided between the adjacent permanent magnets 1.

A cross-sectional shape in a cross-section perpendicular to the rotational shaft 10 of the rotor core 2 changes in the axis direction as is apparent from FIG. 26. The shape is configured such that the concave groove 2a is provided in a region shown by A and the concave groove is not provided in a region shown by B. The cross-sectional shape changes in the order of A, B, A, and B in the axis direction to arrange regions different in magnetic circuit design. Further, the axial length of these regions is expressed by Lr1, Lr2, Lr3, and Lr4. As described above, the structure different in magnetic circuit design in the axis direction is made; and accordingly, a 6th-order torque ripple in electrical angle and cogging torque of an order corresponding to the least common multiple of the number of poles and the number of slots can be reduced by using a cancelling out effect. In FIG. 26, cogging torque and torque ripple in the region A and cogging torque and torque ripple in the region B can be cancelled out.

However, cogging torque caused by variations on the rotor side, for example, an attachment position error, a shape error, and/or variations in magnetic characteristics of the permanent magnets may become large. But, this problem can be solved by providing a stator core structure to be described below.

Figure 27:
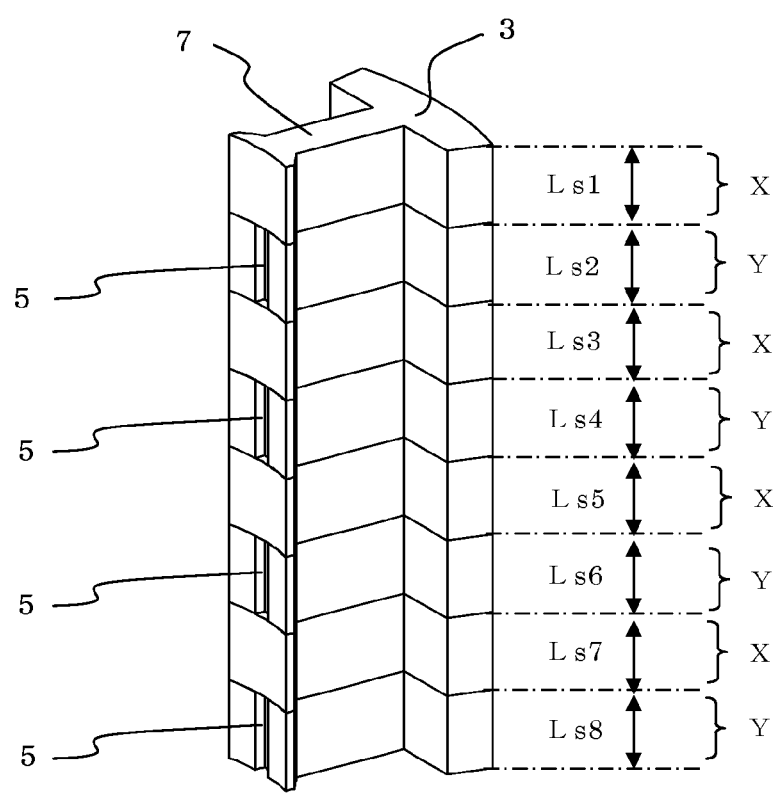
FIG. 27 is a partial perspective view showing a stator core according to Embodiment 3.
Figure 28:
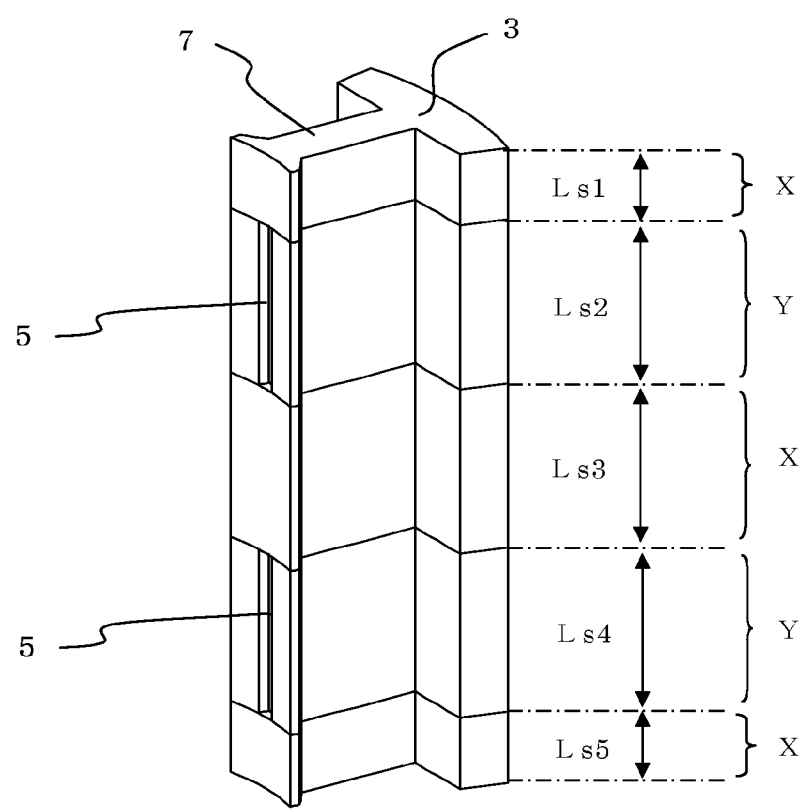
FIG. 28 is a partial perspective view showing other example of a stator core according to Embodiment 3.

FIG. 27 and FIG. 28 are partial perspective views each showing only one tooth of the stator core for ease of understanding. In this case, description will be made using the perspective views, although the description has been made by cross-sectional views as shown in FIGS. 10 to 14 in Embodiment 1. The permanent magnet type rotary electric machine of Embodiment 3 is a configuration example of 10 poles and 12 slots in which twelve stator cores 3 of FIG. 27 are arranged in the circumferential direction so as to surround outside the rotor of FIG. 26. Furthermore, the positional relationship between the rotor 30 and the stator core 3 is a positional relationship in which axial end portions substantially correspond or correspond to each other.

In the stator core 3 of FIG. 27 and in a region facing the region A in which the concave groove 2a of the rotor core 2 is provided, the stator core 3 is composed of two types of regions, a region X in which the supplemental groove 5 is not present and a region Y in which the supplemental groove 5 is present. A region facing the region B in which the concave groove 2a is not present is also composed of two types of regions, the region X in which the supplemental groove 5 is not present and the region Y in which the supplemental groove 5 is present. If such a configuration is made, it becomes possible to considerably reduce cogging torque by using the cancelling out effect as described in Embodiment 1. The axial length of providing the supplemental groove 5 should be approximately ½ (for example, ½±10%) of the axial length of the stator core, and more preferably ½ (for example, ½±5%).

Further, in FIGS. 26 and 27, if the following is given:

$Ls1=Ls2=Lr1/2,$ $Ls3=Ls4=Lr2/2,$ $Ls5=Ls6=Ls3/2,$ and $Ls7=Ls8=Lr4/2,$ as described in Embodiment 1, the axial length of the regions of A-X is equal to that of the regions of A-Y, and the axial length of the regions of B-X is equal to that of the regions of B-Y; and therefore, it becomes a configuration in which the effect of reduction in cogging torque can be more exerted.

Also in the stator core 3 of FIG. 28 and in a region facing the region A in which the concave groove 2a is provided, the stator core 3 is composed of two types of regions, a region X in which the supplemental groove 5 is not present and a region Y in which the supplemental groove 5 is present. A region facing the region B in which the concave groove 2a is not present is also composed of two types of regions, the region X in which the supplemental groove 5 is not present and the region Y in which the supplemental groove 5 is present.

The axial length of providing the supplemental groove 5 should be approximately ½ (for example, ½±10%) of the axial length of the stator core 3, and more preferably ½ (for example, ½±5%).

Further, in FIGS. 26 and 28, if the following is given:

$Ls1=Ls2/2=Lr1/2,$ $Ls2/2=Ls3/2=Lr2/2,$ $Ls3/2=Ls4/2=Lr3/2,$ and $Ls4/2=Ls5=Lr4/2,$ the axial length of the regions of A-X is equal to that of the regions of A-Y, and the axial length of the regions of B-X is equal to that of the regions of B-Y; and therefore, it becomes a configuration in which the effect of reduction in cogging torque can be more exerted.

If such a configuration is made, cogging torque does not considerably increase even when the position of the permanent magnets is out of position in the opening portions provided in the rotor core and the characteristics vary. That is, robustness is high against variations on the rotor side and a cogging torque Sth-order component can be reduced (S denotes the number of slots of the stator core). Further, the shape of the opening portion 9 of the rotor core is designed to be large in the horizontal direction of the permanent magnet. In the case where the air gap portion 9a is formed on the right and left sides of the permanent magnet when the permanent magnet is inserted, the magnetic path portion of the rotor core provided between the adjacent permanent magnets, that is, the core portion 2b between the magnetic poles can be narrow; and therefore, leakage flux can be reduced and a rotary electric machine with small size and high torque can be obtained.

However, a problem exists in that the air gap portion is present on the right and left sides of the permanent magnet; and therefore, the position of the permanent magnet is out of position and an Sth-order component of cogging torque increases. However, if the configuration provided with the stator core of the present invention, effects are exerted in that robustness is high against variations on the rotor side and the cogging torque Sth-order component can be reduced. Further, a structure different in magnetic circuit design in the axis direction is made; and accordingly, a 6th-order torque ripple in electrical angle and cogging torque of an order corresponding to the least common multiple of the number of poles and the number of slots can be reduced.

Embodiment 4

Figure 30:
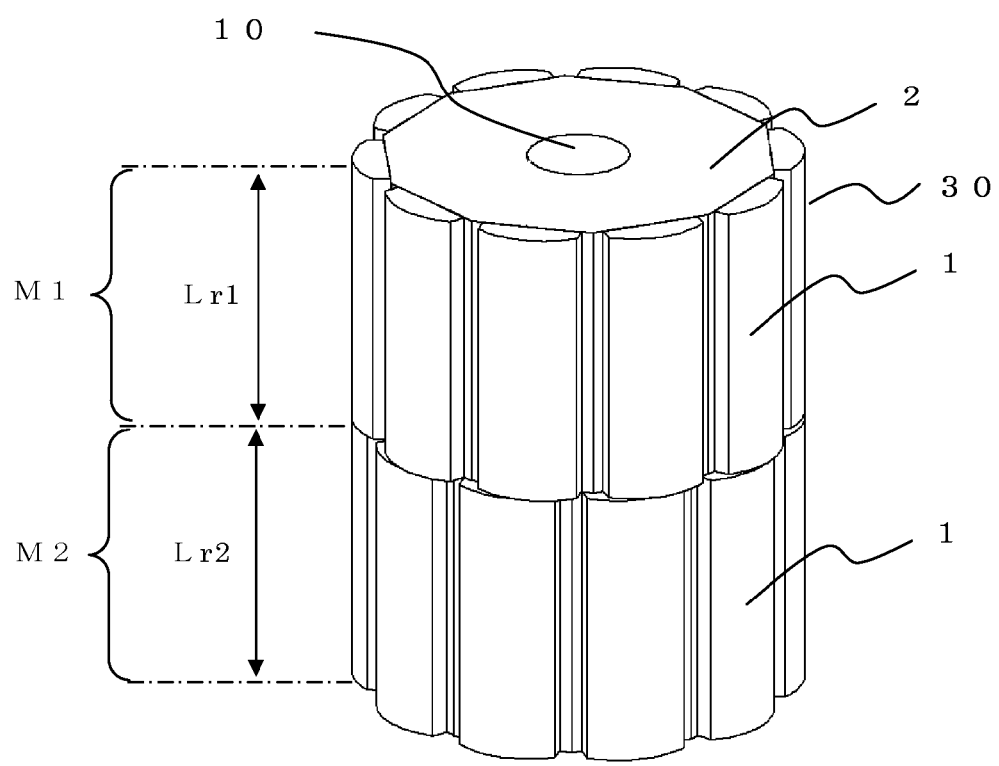
FIG. 30 is a perspective view showing a rotor according to Embodiment 4.

Embodiments 1 to 3 describe the configuration of the permanent magnet type rotary electric machines in which not less than two regions different in magnetic circuit design are provided in a rotational axis direction, the regions being different by changing at least one of a cross-sectional shape in the rotational axis direction in a cross-section perpendicular to the rotational shaft of the rotor core and a cross-sectional shape in a cross-section perpendicular to the rotational shaft of the permanent magnets; however, a different configuration example will be described in this case. FIG. 30 is a perspective view of a rotor in which permanent magnets 1 are provided on a surface portion of a rotor core 2 and the number of poles is 10. The permanent magnets 1 are arranged in two groups in the axis direction and are formed with stepwise skew.

As described above, in the rotor 30 which is configured by not less than two groups of permanent magnets arranged in the axis direction, variations in shape, attachment positions, and the like of the permanent magnets shown in FIG. 14 may be largely changed between not less than two groups of the permanent magnets 1 arranged in the axis direction.

In this case, a problem exists in that, unless the supplemental grooves of the stator core are appropriately provided, a cancelling out effect cannot be obtained to increase cogging torque. Therefore, the problem is solved by the following configuration in the present invention.

Figure 31:
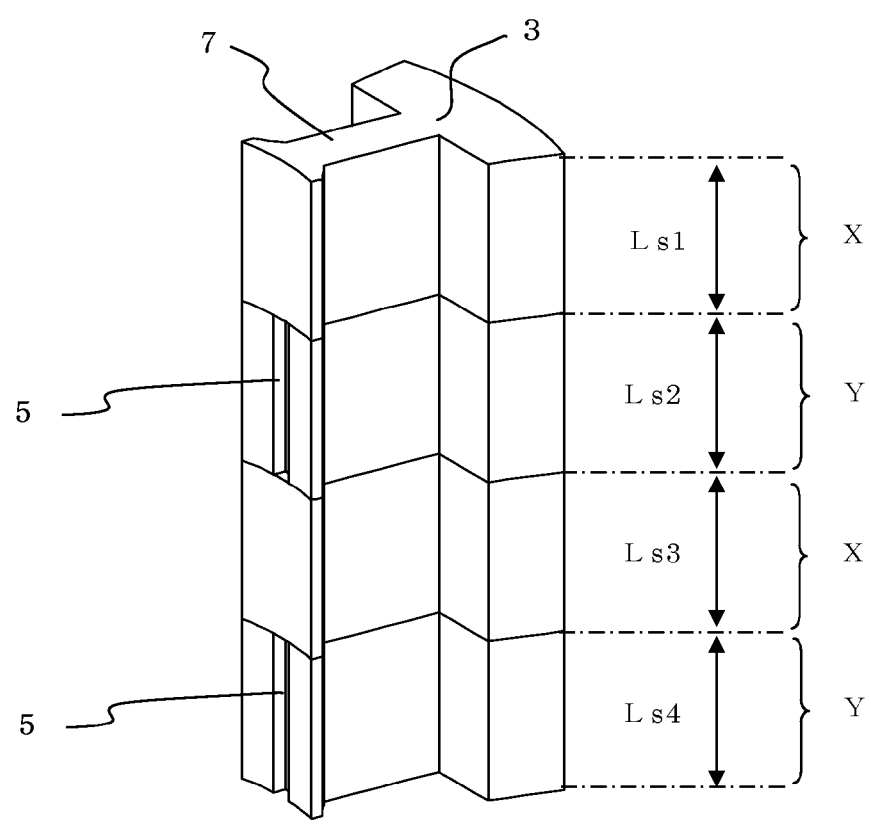
FIG. 31 is a partial perspective view showing a stator core according to Embodiment 4.

As shown in FIG. 30, regions in the rotational axis direction corresponding to the permanent magnets 1 arranged in two groups in the rotational axis direction are expressed by M1 and M2. Further, the axial length of these regions is expressed by Lr1 and Lr2. Meanwhile, FIG. 31 is a partial perspective view showing only one tooth out of twelve teeth of the stator core. A region in which an supplemental groove 5 is not provided is expressed by X and a region in which the supplemental groove 5 is provided is expressed by Y; and arrangement is made in the order of X, Y, X, and Y. Each axial length is expressed by Ls1, Ls2, Ls3, and Ls4.

If states of variations in shape of the permanent magnets, variations in attachment position, and the like are different between M1 and M2, cogging torque increases; and therefore, a structure is designed such that both the presence and absence of the supplemental groove 5 are provided in each region M1 and M2. If such a structure is given, a cancelling out effect in the regions of M1-X and M1-Y and a cancelling out effect in the regions of M2-X and M2-Y are sufficiently exerted; and therefore, a cogging torque Sth-order component (S denotes the number of slots of the stator core) can be reduced even when variations in shape, an attachment position error, and/or variations in magnetic characteristics of the permanent magnets largely change between not less than two groups of the permanent magnets arranged in the axis direction. The axial length of providing the supplemental groove should be approximately ½ (for example, ½±10%) of the axial length of the stator core, and more preferably ½ (for example, ½±5%).

Further, in FIGS. 30 and 31, if the following is given:

$$Ls1=Ls2=Lr1/2$$

and $$Ls3=Ls4=Lr2/2,$$

the axial length of the region of M1-X is equal to that of the region of M1-Y, and the axial length of the region of M2-X is equal to that of the region of M2-Y; and therefore, it becomes a configuration in which the effect of reduction in cogging torque can be more exerted.

Figure 32:
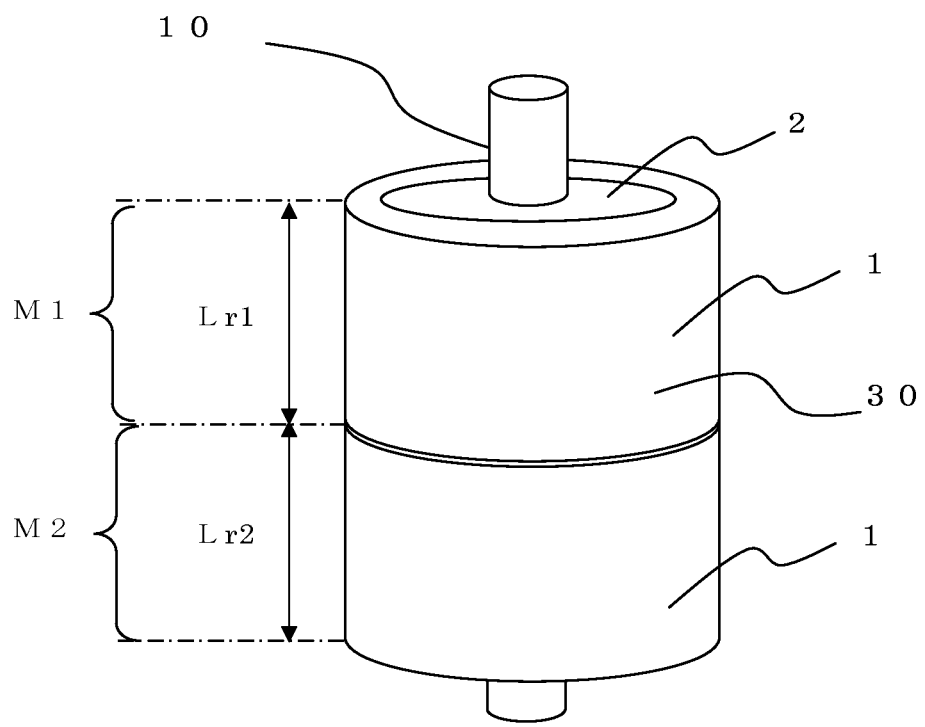
FIG. 32 is a perspective view showing a different example of a rotor according to Embodiment 4.

FIG. 30 is an example in which the permanent magnets 1 are segment magnets, but the application of the present invention is not limited to this example. FIG. 32 is an example in which two ring shaped magnets are arranged in the axis direction. Ring shaped permanent magnets include some magnets that have not radial anisotropy, polar anisotropy, and anisotropy; however, an Sth-order component of cogging torque (S denotes the number of slots of the stator core) may generate by variations in orientation and variations in magnetization. As in the example of FIG. 30, in the case where a variation state is different between the permanent magnets arranged in the axis direction, a problem exists in that, unless the supplemental grooves of the stator core are appropriately provided, a cancelling out effect cannot be obtained to increase cogging torque. Therefore, if the supplemental grooves are arranged as the stator core of FIG. 31, it becomes a configuration in which the effect of reduction in cogging torque can be more exerted. Embodiment 4 shows the example in which two supplemental grooves are arranged in the axis direction; however, it goes without saying that similar effects are exerted even in the case of not less than three supplemental grooves. Further, similar effects are obtained even in a structure other than the configuration of FIG. 31, for example, a region in which the supplemental groove is not provided is expressed by X and a region in which the supplemental groove is provided is expressed by Y; and arrangement is made in the order of X, Y, Y, and X.

FIG. 30 and FIG. 31 describe the examples in which the number of poles (the number of magnetic poles) is 10 and the number of slots is 12; however, Embodiment 4 is not limited to these examples. In the case of the combination of the following relationship $$0.75<S/P<1.5,$$

where, P is the number of poles and S is the number of slots of a permanent magnet type rotary electric machine, there is known a small size and high torque permanent magnet type rotary electric machine in which the winding factor is high and magnetic flux of permanent magnets is efficiently used as compared to the case of S/P=0.75 and S/P=1.5 described in Patent Document 1, Patent Document 2, and Patent Document 3.

Further, the least common multiple of the number of poles and the number of slots are large; and therefore, it is also known that a cogging torque component which pulsates the number of times corresponding to the least common multiple of the number of poles and the number of slots by one rotation of a rotor is small as compared to the case of S/P=0.75 and S/P=1.5. Meanwhile, a problem exists in that a cogging torque Sth-order component (component which pulsates the number of S times by one rotation of the rotor) is large and robustness against variations on the rotor side is low, the cogging torque Sth-order component being generated by variations on the rotor side, for example, an attachment position error, a shape error, and/or variations in magnetic characteristics of the permanent magnets. Therefore, this problem needs to be solved in the permanent magnet type rotary electric machine to be mass-produced as in the case where the rotary electric machine is incorporated in an electric power steering apparatus. Then, if Embodiment 4 is applied to the permanent magnet type rotary electric machine having the combination of the following relationship $$0.75<S/P<1.5,$$

this enables to increase robustness against variations on the rotor side and to reduce the cogging torque Sth-order component.

Furthermore, the supplemental groove is provided at one place in a circumferential center portion of the tooth of the stator core in FIG. 31; and therefore, there can be obtained an effect in that degradation of torque is smaller than the known example. Therefore, it becomes possible to achieve small size and high torque and to increase robustness at the same time; and accordingly, there can be obtained special effects by the configuration of Embodiment 4, the special effects being those that cannot be obtained by Patent Document 1, Patent Document 2, and Patent Document 3.

Embodiment 5

Figure 33:
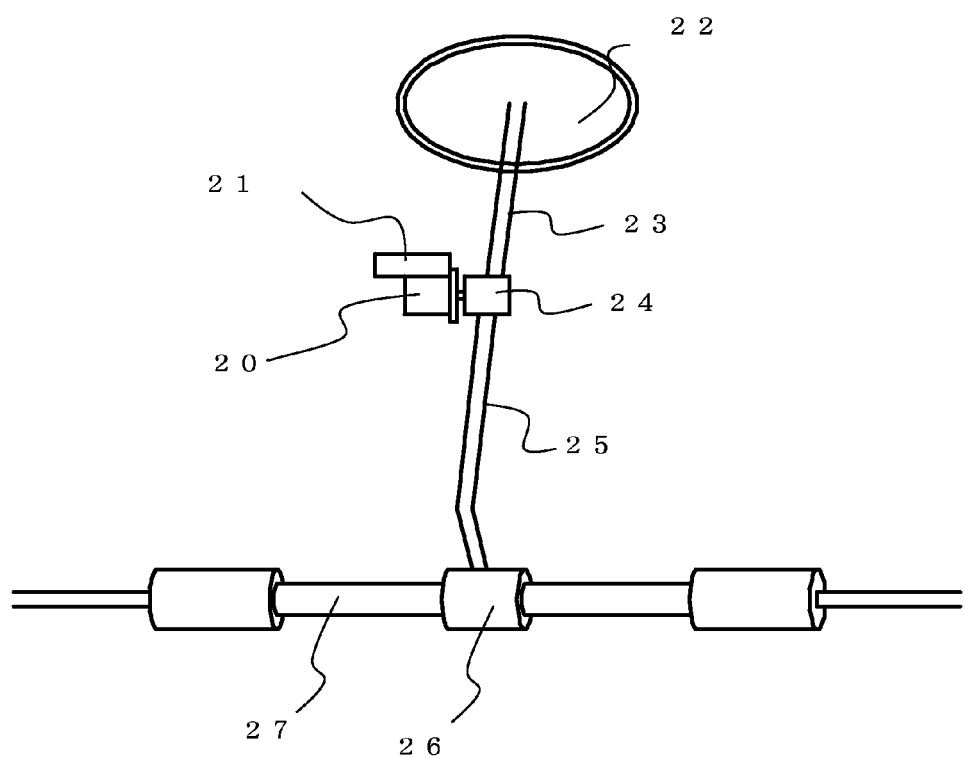
FIG. 33 is a perspective view showing an electric power steering apparatus according to Embodiment 5.

FIG. 33 is a conceptual view showing a vehicular electric power steering apparatus using the permanent magnet type rotary electric machine of Embodiments 1 to 4. In FIG. 33, the electric power steering apparatus includes a column shaft 23 which is for transmitting a steering force from a steering wheel 22. The column shaft 23 is connected to a worm gear 24 whose detail is omitted but only a gearbox is shown in the drawing. The worm gear 24 transmits the output (torque, the number of rotations) of a driving motor 20 controlled by a controller 21 while changing a rotational direction at a right angle, simultaneously decelerates, and increases assist torque. Reference numeral 25 denotes a handle joint that transmits the steering force and also changes the rotational direction. 26 denotes a steering gear whose detail is omitted but only a gearbox is shown in the drawing. The steering gear 26 decelerates the rotation of the column shaft 23 and simultaneously converts to linear motion of a rack 27 to obtain a predetermined displacement. This linear motion of the rack 27 moves wheels to enable the vehicle to change its direction or the like.

In such electric power steering apparatus, the pulsation of torque generated by the driving motor 20 is transmitted to the steering wheel 22 via the worm gear 24 and the column shaft 23. Therefore, in the case where the driving motor 20 generates a large torque pulsation, smooth steering feeling cannot be obtained. However, the permanent magnet type rotary electric machine of Embodiments 1 to 4 is incorporated as the driving motor 20 of the electric power steering apparatus of Embodiment 5; and accordingly, torque pulsation can be reduced. Therefore, the steering feeling in the electric power steering apparatus can be improved.

Furthermore, the driving motor for the electric power steering apparatus is mass-produced; and therefore, a problem exists in that robustness of cogging torque against variations in manufacture needs to be improved. In response, the permanent magnet type rotary electric machine described in Embodiments 1 to 4 is mounted and accordingly a cogging torque component caused by variations in the rotor can be considerably reduced; and therefore, an effect is exerted in that the robustness improves.

Various modifications and alternations of this invention can be achieved to those skilled in the art without departing from the scope and spirit of this invention, and it should be understood that this is not limited to the respective illustrative embodiments set forth in the description.

The invention claimed is:

1. A permanent magnet type rotary electric machine comprising:
   a rotor having a plurality of magnetic poles composed of permanent magnets and a rotor core; and
   a stator including armature windings and a stator core which is provided with slots for incorporating said armature windings and has a plurality of teeth facing said rotor,
   each of said teeth of said stator core being provided with supplemental grooves at portions facing said rotor,
   wherein not less than two regions different in magnetic circuit design are provided in a rotational axis direction of said rotor, the regions being different by changing a cross-sectional shape in the rotational axis direction in a cross-section perpendicular to a rotational shaft of said rotor having said permanent magnets and said rotor core;
   the supplemental grooves are provided in axial partial regions of said tooth of said stator core; and
   the region in which the supplemental groove is provided is each partial region for each region facing a same region in magnetic circuit design of the rotor,
   wherein said rotor core is provided with protrusion portions formed of a magnetic material, the protrusion portions retaining said permanent magnets, at portions in the rotational axis direction;
   the supplemental grooves are provided in axial partial regions of said tooth of said stator core; and
   the region in which the supplemental groove is provided is each partial region for each region facing a region in which the protrusion portion is provided and a region in which the protrusion portion is not provided.

2. The permanent magnet type rotary electric machine according to claim 1,
   wherein the region in which the supplemental groove is provided is a region half of each axial length for each region facing the region in which the protrusion portion is provided and the region in which the protrusion portion is not provided.

3. The permanent magnet type rotary electric machine according to claim 2,
   wherein the supplemental groove is provided at one place in a circumferential center portion of said stator core at a portion in which the tooth faces said rotor.

4. The permanent magnet type rotary electric machine according to claim 1,
   wherein a width Wd of the supplemental groove is larger than a opening width Ws of the slot.

5. The permanent magnet type rotary electric machine according to claim 1,
   wherein a depth Hd of the supplemental groove is larger than a thickness Hs of an end portion of said tooth.

6. The permanent magnet type rotary electric machine according to claim 1,
   wherein the supplemental groove is not provided in an axial end portion of said stator core.

7. The permanent magnet type rotary electric machine according to claim 1,
   wherein the supplemental groove is provided at one place in a circumferential center portion of said stator core at a portion in which the tooth faces said rotor.

8. The permanent magnet type rotary electric machine according to claim 1,
   wherein when the number of poles of said magnetic poles of said rotor is P and the number of the slots of said stator is S, the following relationship is established:

$0.75 < S/P < 1.5$.

9. The permanent magnet type rotary electric machine according to claim 1,
   wherein the number of poles P of said magnetic pole of said rotor is $12n \pm 2n$ and the number of the slots S of said stator is $12n$, n being natural number.

10. The permanent magnet type rotary electric machine according to claim 1,
    wherein the number of poles P of said magnetic pole of said rotor is $9n \pm n$ and the number of the slots S of said stator is $9n$, n being natural number.

11. An electric power steering apparatus using a permanent magnet type rotary electric machine as set forth in claim 1 as a driving motor.

12. A permanent magnet type rotary electric machine comprising:
    a rotor having a plurality of magnetic poles composed of permanent magnets and a rotor core; and
    a stator including armature windings and a stator core which is provided with slots for incorporating said armature windings and has a plurality of teeth facing said rotor,
    each of said teeth of said stator core being provided with supplemental grooves at portions facing said rotor,
    wherein said rotor includes a plurality of magnetic poles configured by embedding said permanent magnets in a plurality of opening portions in a rotational axis direction, the opening portions being provided in said rotor core; and
    said rotor core includes concave grooves each formed on a surface portion at an axial portion between adjacent magnetic poles along said magnetic poles,
    wherein not less than two regions different in magnetic circuit design are provided in the rotational axis direction of said rotor, the regions being different by changing a cross-sectional shape in the rotational axis direction in a cross-section perpendicular to a rotational shaft of said rotor having said permanent magnets and said rotor core;

the supplemental grooves are provided in axial partial regions of said tooth of said stator core; and the region in which the supplemental groove is provided is each partial region for each region facing a region in which the concave groove is provided and a region in which the concave groove is not provided.

13. The permanent magnet type rotary electric machine according to claim 12, wherein the region in which the supplemental groove is provided is a region half of each axial length for each region facing the region in which the concave groove is provided and the region in which the concave groove is not provided.

* * * * *